United States Patent
Hardy

(10) Patent No.: US 10,707,686 B2
(45) Date of Patent: Jul. 7, 2020

(54) BATTERY MANAGEMENT

(71) Applicant: Intercal (UK) Limited, Redditch, Worcestershire (GB)

(72) Inventor: John Hardy, Redditch (GB)

(73) Assignee: INTERCAL (UK) LIMITED, Worcestershire (GB)

( * ) Notice: Subject to any disclaimer, the term of this patent is extended or adjusted under 35 U.S.C. 154(b) by 0 days.

(21) Appl. No.: 15/325,994

(22) PCT Filed: Jun. 30, 2015

(86) PCT No.: PCT/GB2015/051903
§ 371 (c)(1),
(2) Date: Jan. 12, 2017

(87) PCT Pub. No.: WO2016/009175
PCT Pub. Date: Jan. 21, 2016

(65) Prior Publication Data
US 2017/0214256 A1   Jul. 27, 2017

(30) Foreign Application Priority Data

Jul. 16, 2014   (GB) .................................. 1412636.1
Apr. 14, 2015   (GB) .................................. 1506337.3

(51) Int. Cl.
*H02J 7/00* (2006.01)
*B60L 58/22* (2019.01)

(52) U.S. Cl.
CPC ............ *H02J 7/0026* (2013.01); *B60L 58/22* (2019.02); *H02J 7/007* (2013.01); *H02J 7/0013* (2013.01); *H02J 7/0018* (2013.01); *H02J 7/0086* (2013.01); *Y02T 10/7055* (2013.01)

(58) Field of Classification Search
CPC ....... H02J 7/0016; H02J 7/0018; H02J 7/0021
USPC .......................................................... 320/116
See application file for complete search history.

(56) References Cited

U.S. PATENT DOCUMENTS

| 5,387,857 | A | * | 2/1995 | Honda ................. H02J 7/0016 320/120 |
| 7,528,574 | B1 | | 5/2009 | Adkins et al. |
| 2003/0041445 | A1 | | 3/2003 | Jang et al. |
| 2011/0241623 | A1 | | 10/2011 | Wade et al. |
| 2013/0224528 | A1 | | 8/2013 | Johnson et al. |

(Continued)

FOREIGN PATENT DOCUMENTS

| CN | 203491740 U | 3/2014 |
| WO | WO2011094348 | 8/2011 |
| WO | WO2011126909 | 10/2011 |

*Primary Examiner* — Edward Tso
*Assistant Examiner* — Ahmed H Omar
(74) *Attorney, Agent, or Firm* — Stetina Brunda Garred and Brucker

(57) ABSTRACT

The invention provides a method and apparatus for managing a battery comprising a plurality of series connected cells. The battery comprises a plurality of series connected statically balanced cells. The battery is arranged so that a substantially identical load is imposed on all of the cells, in use in order to maintain the balance. A battery charging controller is used for controlling the charging of the battery as is arranged to terminate charging prior to the cells reaching their maximum state of charge. The invention also provides a modified charging regime which controls individual cell voltage to avoid any single cell exceeding a desired voltage.

22 Claims, 11 Drawing Sheets

(56) References Cited

U.S. PATENT DOCUMENTS

| | | |
|---|---|---|
| 2013/0224529 A1 | 8/2013 | Lee et al. |
| 2014/0062407 A1 | 3/2014 | Brisebois |
| 2015/0042351 A1 | 2/2015 | Greenberg |
| 2015/0236536 A1* | 8/2015 | Aradachi .............. H02J 7/0021 320/112 |
| 2016/0049821 A1* | 2/2016 | Aridome ............... H02J 7/0073 320/128 |

* cited by examiner

BATTERY MANAGEMENT

CROSS-REFERENCE TO RELATED APPLICATIONS

The present application claims priority to PCT International Application No. PCT/GB2015/051913 filed on Jun. 30, 2015, which claims priority to UK Patent Application No. 1412636.1 filed Jul. 16, 2014 and UK Patent Application No. 1506337.3 filed Apr. 14, 2015, the entirety of the disclosures of which are expressly incorporated herein by reference.

STATEMENT RE: FEDERALLY SPONSORED RESEARCH/DEVELOPMENT

Not Applicable

FIELD OF THE INVENTION

This invention relates to managing charge and discharge of batteries, in particular batteries comprising long series strings of cells.

BACKGROUND TO THE INVENTION

Battery Management Systems ("BMS") are typically used for the control of charging and discharging of a battery or batteries in a battery power source system. The BMS typically manages the operation of such systems but can also provide important fail safety actions to prevent potentially hazardous consequences should a fault occur.

A BMS is important for applications using a battery made up of long strings of cells based on intercalation chemistry ("intercalating cells"). The batteries (sometimes called "battery packs") typically consist of series strings of large individual cells or alternatively strings of "modules", each module comprising a batch of small cells connected in parallel. Any references hereinafter to "cell" should be read, where the context permits, to include such modules.

Batteries consisting of intercalating cells including without limitation all lithium-ion and lithium polymer cell types are commonly used. These batteries are used in various applications, including for electric vehicles ("EV"), in some aircraft, for grid storage and for emergency or stand-by power.

A typical BMS measures the voltage of each cell in the battery and typically has the following discrete functions:
  a) It stops charge when the first cell reaches its maximum voltage;
  b) It stops discharge when any cell reaches a minimum voltage;
  c) It performs "active balancing", that is equalisation of cell voltages on each charge/discharge cycle (see below);
  d) It identifies voltage fluctuations symptomatic of a failed or failing cell and raises an exception.

The day-to-day purpose of the BMS is primarily to ensure that, over each charge/discharge cycle, all the cells in a battery are charged and then discharged as fully as possible, while ensuring there is no over-charging or over-discharge of any of the cells. Monitoring for signs of failing cells is a very important secondary function.

These functions are needed because:
  a) Over-charging of any cell can cause overheating and even fire.
  b) Over-discharge of one or more cells in a battery can result in accelerated ageing or can cause "voltage reversal" where the more fully charged cells in effect charge the weaker cells backwards, typically resulting in irreversible damage to the affected cells.
  c) Where the voltage monitoring apparatus of an active-balancing BMS identifies a defective or failing cell, it can signal an alert to trigger a suitable safety response before the cell overheats or catches fire.

Active balancing (equalisation of cell voltages under load on each charge/discharge cycle) is a method intended to ensure that all cells remain at a consistent state of charge (SoC) throughout the battery life. The rationale for this is that it is thought necessary to prevent the SoC of individual cells in a battery drifting apart over a series of charge/discharge cycles. Voltage drift is a well-known phenomenon observed when testing long strings of various cell types under various conditions. In any situation where SoC drift occurs, charging and discharging without active balancing progressively limits the amount of charge and discharge that can be achieved without causing some cells to be over-charged or others to be over-discharged. The effect is to progressively reduce the usable capacity of the battery.

An active-balancing BMS uses one of a variety of techniques to try to equalise charge between cells. This may involve shunting charge between cells or draining ("dumping") charge from any cells which are approaching over-charge. This process usually occurs towards the end of the charge cycle and is generally referred to as "top-balancing".

The purpose of top balancing is to try to ensure that, on termination of charge, all cells are equally and fully charged. No cell is permitted to be charged to a voltage higher than a predetermined safe maximum. All cells are thereby intended to reach full discharge more or less equally, so maximising the usable capacity of the battery on each charge cycle.

However, there are three key drawbacks with using an active-balancing BMS:
  a) It requires many electrical connections which results in many possible points of failure
  b) Cell voltage monitoring is not a fully adequate means of assessing the state of health ("SoH") of individual cells
  c) Top balancing uses the measured voltage of the cells as part of the technique for achieving full battery charge. However, the voltage of intercalating cells may not stabilise for a period of time after charging ceases and very large transitory divergences in cell voltages can occur in well-balanced batteries at the top of charge. Research into lithium cells has shown that cell voltage is not a good indication of SoC unless the cells are open circuit and "rested" i.e. sufficient time has passed since the last current flow in the cell for the cell voltages to stabilise. This can only be done statically either before assembly or during routine maintenance when the cells can be allowed to rest. It follows that a technology based on balancing the battery at the top of charge may partly unbalance the cells, leading to a loss of usable battery capacity.

The in-service record of active balancing BMS reflects these drawbacks. A significant number of fires in vehicles and other applications using active balancing BMS have been found on investigation to result from the very intense heat generated by thermal runaway of a lithium ion battery during charging. There have also been cases of fires starting in vehicle batteries while being discharged in active use. This is typically associated with loose cell connections; with operational currents during discharge typically up to several hundred amps, a loose or poor connection in a battery can quickly generate very high local temperatures.

Likewise, at least two instances of lithium battery fires have occurred in a modern commercial aircraft type even though duplicate active BMS were installed. The US National Transport Safety Board is currently reviewing the design of the battery system as part of its investigations.

Though less catastrophic, cell damage caused by accidental over discharge remains a significant issue affecting battery life and capacity which current BMS have not eliminated.

Partly because of the risks and uncertainties inherent in current BMS techniques, BMS used in commercially manufactured EVs and other applications often only use a proportion of the capacity of the battery. One current production EV for example allows the use of only about 65% of the available cell capacity, the remainder providing a safety margin to avoid the risk of overcharging or undercharging. This is significant given the high cost, bulk and weight of batteries and in particular the challenge of maximising the range of an EV on a single charge.

Concern about fail-safety of BMS has led to increased application of temperature monitoring of batteries and cells, designed to detect signs of thermal runaway before a fire results. While these methods have tackled some of the inherent safety weaknesses of the active balancing BMS, this is at the expense of added expense and complexity.

FIG. 1 is a schematic representation of a typical active balancing BMS based on cell voltage monitoring. For this illustration the primary consumer of power is assumed to be a motor 7 controlled by a motor controller 6.

The battery itself consists of a number of cells 2 joined by cell straps or bus-bars 3 connecting alternate positive terminals 4 and negative terminals 5. The battery management system master unit 1 has a dedicated sense wire 8 connected to each cell 2. The master unit controls the motor controller 6 and charger 9 which receives power from an external power source 10. The motor controller supplies power to the motor 7.

There are many variants of this topology using master-slave configurations or even cell-level BMS boards.

There are a number of issues with the BMS such as that shown in FIG. 1 which rely on detecting anomalies in the measured voltages on each cell to determine faults with the batteries as well as charging levels. Whilst the cell voltage can be used as an indicator of individual cell overcharge or over-discharge, it is not always completely reliable. In addition the voltage may not provide a clear indicator at an early stage of other problems. The main issues are:

a) For each cell there is at least one wired voltage-monitoring electrical connection 8, each being a possible point of failure. There may be a hundred or more of these wires in a typical EV battery of 300+ volts. If any one of the voltage sense wires shorts to ground the corresponding cell may be discharged to the point of damage;

b) The master unit 1 also needs to be constructed to receive and handle a large number of high voltage sense inputs from the above arrangement. This creates problems of reliability and maintenance in the master unit itself;

c) When a cell is damaged or is failing this may not immediately affect the voltage on the cell concerned and so there may be some delay before a voltage deviation sufficient to alert the BMS occurs. This may be too late to prevent significant damage or even catastrophic failure of the battery.

d) If a cell strap 3 is loose or has a poor connection, this can lead to significant resistance, causing the voltage readings to be incorrect with consequent under or over-charging of the cell;

e) If one of the voltage sense wires goes open circuit, the voltage reading will likewise be incorrect;

f) Poor connections between the cells such as on the inter-cell straps or bus bars or internal cell failure can lead to rapid overheating and potential damage. These may not initially show as voltage anomalies;

g) There is no mechanism to detect short circuits caused for example by foreign objects coming into contact with the external connections of the battery since this may appear as a load on the battery but not as a significant individual cell voltage deviation.

h) If the master unit 1 itself, or the connection between the master unit and the charger, fails for any reason, the charger may not receive instructions to shut down at the end of charge. This is the probable cause of some of the incidents cited earlier.

In addition to the above, the use of top balancing using cell voltage monitoring has another potential drawback.

This arises from the fact that the individual cells in a battery will not all have exactly the same capacity. Therefore even if top balancing could be performed perfectly, the cells with slightly lesser capacity would be fully discharged before those with greater capacity. In other words, balancing the cells at the top of charge inevitably means that they are unbalanced at the bottom. If discharge continues past the point where the weakest cell is exhausted (i.e. has discharged to the point below which further discharge is undesirable), that cell will continue to receive current reducing the voltage across it. Driving a cell beyond this point can lead to irreversible damage to the cell. Further forced discharge can continue until the cell voltage is pushed into voltage reversal which in practice always destroys the cell.

One of the other functions of a typical current generation BMS is to shut down discharge when any individual cell voltage gets too low. Such a BMS should therefore prevent this by shutting down discharge before cell damage occurs, but if a system failure occurs, loss of one or more cells is highly likely. Additionally in some cases a small residual drain from the battery continues after shut down i.e. when the BMS is inactive. This can result in destruction of the pack: again there have been published incidents where an EV with a near discharged battery has been parked for a long period. The small residual current exhausts the battery and (being unbalanced at the bottom) some cells are driven into voltage reversal.

Damage to cells due to this kind of voltage reversal is, for this reason, fairly common with top balancing BMS. In contrast, bottom balanced battery packs are considered less likely to be damaged in this way and are thus more able to survive very deep accidental over-discharge of the battery without loss of cells. This is because although the cells are all over-discharged, as they are balanced none are pushed into voltage reversal because no cells are significantly stronger or weaker than any other at the bottom of discharge.

In summary, there are a number of issues with existing BMS arrangements. The present invention sets out to overcome or ameliorate at least some of these issues.

Experience with current batteries managed with a conventional BMS is that the individual cells do not maintain their SoC relative to each other without an active balancing stage as part of the charge cycle. This divergence in the SoC of cells over time is generally believed to be caused by a number of factors. However, it is also thought to be difficult or impossible to avoid and the solution generally applied is to use active balancing to maintain a relatively consistent SoC for all cells.

It is, however, possible to remove the routine causes of loss of balance in normal use.

One significant factor in the divergence of SoC of cells is the presence of unbalanced parasitic loads on the cells in a standard BMS configuration. These parasitic loads can be caused by wiring in low voltage instrumentation or ancillary apparatus to one cell or a group of cells, but less obviously it is possible to have this effect through the arrangement of the voltage monitoring connections themselves. Accepted practice in most domains is to regard the current used by a voltmeter, typically of the order of 20-40 micro-amps, as negligible. Even though a voltage measuring circuit may only draw a tiny current, however, this drain will be continuous throughout much of the operating life of the system. Over time, it can be shown that this current drain may amount to a significant amount of asymmetric charge removal.

A typical voltage monitoring architecture in a battery of 100 cells will involve measuring the difference between the pack negative and each cell junction. Individual cell voltage will be computed by subtraction. In such a structure, the current draw from the first cell might be around 35 micro-amps, flowing through that cell only. The current draw from the second cell will also be 35 micro-amps, but will flow through the second and first cells. This continues for each additional cell such that unbalanced load will cumulate, with the difference in over 100 cells in this example amounting to some 3.5 milliamps. A voltage monitoring device left permanently connected for 12 months (8,760 hours) would unbalance the pack (first cell compared to hundredth cell) by around 30 amp hours. Given that a typical battery of this size might have a total capacity of say 70-80 amp hours, a loss of balance on this scale would be very material. More sophisticated voltage monitoring systems with isolated monitors on each cell reduce the severity of the problem but do not eliminate it.

A second significant source of cell imbalance in batteries is that internal impedance and other factors can cause temporary voltage divergences between cells for reasons other than differing SoC. This effect appears to be at its worst when the battery is nearly full, close to the end of the charging process. Unfortunately, this is typically the point at which a conventional BMS attempts to balance the pack.

In a conventional BMS, top balancing is generally preferred, i.e. balancing when the battery is close to full charge, compared to bottom balancing (equalising cell voltages at or near full discharge). One significant reason for this is because bottom balancing must be carried out close to the point of complete discharge of the battery and this may not be convenient. Batteries are not always fully discharged when they are required to be recharged. For example in an EV, the battery may be only partly discharged when the vehicle is no longer required but needs to be fully recharged ready for future use. If the battery is only partly discharged, then to carry out bottom balancing, it would be necessary to complete the discharge process. This will take time which might be required for charging as well as wasting energy.

As noted above, since the top of charge is the point in the discharge cycle where cell voltages tend to diverge for reasons other than state of charge, a BMS that balances voltages at this point may actually introduce a degree of imbalance.

A third factor causing cell imbalance is a process of self-discharge which can occur in defective cells as a consequence of internal "soft shorts". Soft shorts are thought to be caused by impurities of defects in manufacture (see for example "Advanced Mitigating Measures for the Cell Internal Short Risk" by Darcy et. al 2010), or sometimes as a result of abuse of the cells. Even though this discharge may not be very large, it would over time cause those cells to go out of balance compared to the others.

The usual procedure for charging a single lithium ion cell is to use a constant current/constant voltage (CC/CV) algorithm. This normally involves three steps (possibly more if the initial cell voltage is very low) which can be seen in FIG. 7. The steps are:

a) The battery is charged at a constant pre-determined current 52 (which will depend upon the size of the cell and other factors). During this phase the cell voltage 51 will gradually rise. This is known as the "Constant Current" or "CC" phase.

b) When the cell voltage reaches a predetermined level the charger will start reducing the current to keep the cell voltage at a constant level. This is known as the "Constant Voltage" or "CV" phase.

c) When the current drops to a second preselected level (typically 5% of the original charge current), charging is positively terminated This approach is often described as the CC/CV charge profile. The voltage at which the charger changes from the CC to CV phase will depend on the cell and is typically defined by the manufacturer as a charging upper limit voltage.

The same CC/CV profile is frequently used for charging batteries composed of multiple cells in series, and here it is less successful. Even if the overall battery voltage is kept constant in the CV phase, the individual cell voltages may diverge widely. A typical conventional BMS may have to command early charge termination if the voltage of one or more cells rise excessively, even if none of the cells are fully charged.

BRIEF SUMMARY OF THE INVENTION

Therefore according to the present invention, there is provided a rechargeable battery management system comprising: a battery comprising a plurality of series connected statically balanced cells, wherein the battery is arranged such that a substantially identical load is imposed on all of the cells, in use; and a battery charging controller for controlling the charging of the battery by terminating charging prior to the cells reaching their maximum state of charge.

Statically balanced cells are preferably equalised before assembly or at least before use, rather than being dynamically balanced when in service. Providing statically balanced cells when the battery is first prepared allows the battery to be run in a substantially balanced state without the need to rebalance the battery frequently and at least not on each charge/recharge cycle, as is generally considered necessary in prior art systems. By avoiding the need for balancing of the battery, the need for complex high voltage wiring arrangements, which have to carry balancing charge current, can be avoided. Whilst connections to cells may still be provided, these can be left unconnected most of the time and only used for occasional monitoring or servicing. This helps to reduce the problem of unbalanced parasitic loads described above.

By additionally terminating charging prior to the cells reaching their maximum state of charge, the risk of overcharging individual cells can be avoided. As mentioned above, variations in cells and their response when close to full charge varies, which can lead to differential charging of the cells. If charging is continued to close to full capacity (e.g. charging until charging current falls to 5 or 10% of initial charge current), as is typical for existing charging arrangements, the risk of exceeding cell voltage limits on a few cells is increased. By terminating charging early, the risk of exceeding cell voltage limits is reduced.

Preferably, the cells are pre-qualified prior to inclusion in the battery, to exclude cells which have soft shorts. By avoiding cells which include soft shorts, variations over time of the state of charge of individual cells can be avoided. Cells with soft shorts will lose charge, potentially only at a very low rate, but this will bring them out of balance with the other cells in the battery. Pre-qualifying the cells included in the battery allows the cells to be closer in their characteristics to reduce any divergence in state of charge over time. The tolerances on the filtration process can be selected to ensure that all cells will maintain sufficiently close state of charge to each other over a period of time or charge/discharge cycles, e.g. the service interval (which may in some cases be the expected life of the battery, i.e. where no mid-life servicing is anticipated).

The pre-qualifying of the cells may comprise discharging the cell, monitoring the cell voltage over time and disqualifying cells which show a drop in cell voltage. As indicated above, the acceptable parameters will reflect the degree of uniformity required in the cells. Higher uniformity will provide better long term balance in the battery but low tolerance may be allowed where balancing is carried at service events and so longer term balance is less critical.

The cell terminals of each cell may be only connected to the terminals of adjacent cells with no other connections to the cell terminals, other than the cell terminals at each end of the battery. In other words, the cells are connected sequentially with only the ends of the cells having connections which form the battery connections. This ensures that there is no current drawn from the connections (e.g. straps or bus bars) between cells and so all current passing from one cell passes into the next. This ensures that there is no difference in the load current from the first cell to the last which helps to maintain the balance of the cells relative to each other.

Alternatively, the cell terminals of each cell may be connected to impose a substantially identical load on each cell, in use, preventing any load current being drawn from the cells at intervening cell terminal connections between the ends of the battery. With this arrangement, there may be external connections provided to the connections between the cells. The external connections may be disconnected in normal use and only connected during service events, usually after a significant number of charge/discharge cycles.

Alternatively, external connections to the cells may be arranged so that any current drawn from them is controlled so that the net charge through each cell is substantially identical. This may be a time averaged load such that the instantaneous load is not identical but over time the load is balanced. For example, a voltmeter may be sequentially applied to each cell to measure the voltage for a short period of time. As long as the total charge removed from each cell is identical and every cell is monitored in the same way then the cells will remain balanced.

The battery charging controller is preferably arranged to control charging of the battery using an initial charging current controlled charging phase followed by a charging voltage controlled phase, and terminating charging during the charging voltage controlled phase when said charging current falls below a first threshold. As noted above, this allows charging to stop before imbalance in cell voltage can occur due to different responses to charging of cells close to the top of charge. The threshold is preferably selected to ensure that all cells remain in a condition where they have substantially identical response to the charging, e.g. the cell voltages remain consistent.

The voltage thresholds referred to above can be determined based on the actual cells of the battery, such that above the first threshold, the individual cell voltages do not deviate substantially from each other. The threshold may not be a fixed level but may be varied, for example, according to the type and quality of the cells used or the specific characteristics of the cells in a given battery. This may be determined prior to first use of the battery and may be adjusted over the life of the battery.

In prior art systems, batteries are typically charged with a constant current (CC) phase followed by a constant voltage (CV) phase where the charge current declines (the "CC/CV" charge profile). Prior art systems will typically terminate charge when the charging current falls to 5 or 10% of the charge current at the start of the constant voltage phase. In the invention, the first threshold is preferably between 50% and 95% of the charging current at the start of the charging voltage controlled (CV) phase. More preferably, it is between 70% and 90% of the charging current and more preferably between 75% and 85% of the charging current at the start of the charging voltage controlled phase.

The battery charging controller is preferably adapted to carry out one or more additional charging periods, after terminating charging, in which charging is restarted after a rest period and charging is again terminated. The rest period allows the battery cells to recover before charging is restarted.

The rest period preferably has a duration of between 2 and 15 minutes. This duration will preferably be selected according to the type and properties of the cells and may be adjusted in use to accommodate other factors such as aging of the cells and so on.

During said one or more additional charging periods charging may be controlled using battery voltage control and charging is terminated when said charging current falls below a second threshold value. The second threshold value is preferably the same as said first threshold value but may also have other values.

The rest period preferably ends when the battery voltage drops below a rest voltage value. This allows the cells to recover during the rest period until they reach the rest voltage value indicating that charging may continue.

The present invention also provides a rechargeable battery management system comprising: a battery comprising a plurality of series connected cells; cell voltage monitoring means for determining the respective cell voltage of each of said plurality of cells; and a battery charging controller arranged to control charging of the battery using an initial battery charging current control phase followed by a cell voltage control phase, and to determine a maximum cell voltage value, being the cell voltage on one of said plurality of cells having the highest cell voltage, wherein said battery charging controller is further arranged to control the charging of the battery, during said cell voltage control phase, to maintain the maximum cell voltage value at a target value.

The battery charging controller is preferably arranged to terminate charging during the cell voltage control phase when said charging current falls below a third threshold value.

The third threshold value may be between 2% and 15% of the charging current at the start of the charging voltage controlled phase. More preferably, the third threshold value is between 4% and 6% of the charging current at the start of the charging voltage controlled phase.

The plurality of cells may be pre-qualified prior to inclusion in the battery, to exclude cells which have soft shorts. The plurality of cells may also be statically balanced prior to inclusion in the battery or prior to use.

The pre-qualifying of said cells may comprise discharging the cell, monitoring the cell voltage over time and disqualifying cells which show a drop in cell voltage.

Different charging regimes may be applied, for example, during the constant voltage phase, the voltage may be pulsed but the current measured during the on periods can still be used to determine when to terminate charging.

The battery management system may also include a plurality of temperature sensors, each arranged for sensing the temperature of at least one of said cells, and a battery monitor. In this arrangement, the temperature sensors are configured to provide temperature information signals to the battery monitor. The battery monitor can then be configured to determine whether each of the received temperature information signals conforms to an acceptable pattern and the battery monitor configured to raise an exception, if one of more of the received temperature information signals does not conform to said acceptable pattern.

In this way, monitoring of the battery can be carried out based on the temperature characteristics measured by the sensors rather than by inference from voltage measurements. Temperature can provide information which in some cases is more useful in identifying problems within a battery and its constituent cells and also quicker in some cases than basing monitoring on voltage or current measurements. The temperature sensors can also be isolated from the main electrical charge carrying components. This can help to avoid potential problems due to electrical connections and faults due to such connections failing. Furthermore, the temperature sensors will impose no electrical load on the system and so will have no effect on the balance of the cells.

The measured temperatures can be used in a number of ways to monitor different aspects of the battery operation. The acceptable pattern may simply be a range of temperatures that it is considered acceptable for the battery to operate at. For example, the acceptable pattern may indicate that temperatures below a specific value such as 100° C. are acceptable and if any temperature sensor exceeds that temperature then it would not conform to the acceptable pattern and the system may take suitable action such as to stop charge or discharge.

The monitored temperature may be considered not to conform to an acceptable pattern if the rate of change of the monitored temperature is outside a second predetermined range. If a cell is damaged or some other fault condition occurs, then the temperature can rise very quickly. The absolute temperature may still be in an acceptable range but the rapid rise in temperature may be defined as being outside an acceptable pattern and again this may indicate a problem. The conditions may be applied in parallel, for example a temperature must be below 100° C. and must not be rising at a rate greater than 20° C. $s^{-1}$. Even more complex patterns may be used where the parameters change according to other parameters. For example, the acceptable rate of change may be 20° C. $s^{-1}$ below 50 C but 10° C. $s^{-1}$ above 50.

The acceptable pattern may take into account the variance of the monitored temperature from an average temperature of two or more of the temperature sensors and if the variance is greater than a first predetermined amount, it is outside the acceptable pattern.

A monitored temperature may be determined not to conform to an acceptable pattern if the variance of the rate of change of said monitored temperature from an average rate of change of temperature of two or more of the temperature sensors is greater than a second predetermined amount.

Other measures based on the temperature may be used such as the rate of change of the rate of change of temperature.

An exception may be raised only after one of more of the received temperature information signals does not conform to said acceptable pattern for a predetermined duration. This may be to provide a degree of hysteresis into the system or to allow for transient fluctuations. For example, when a vehicle starts to move a large initial current may flow which might lead to a rapid temperature change. This might be acceptable as long as it subsides within a certain period.

The battery monitor may be further configured to base the determination of whether to raise an exception upon the estimated state of charge of the battery or upon the current in the battery. It may also base this on other factors either alone or in combination with those mentioned above.

When an exception is raised, the battery monitor may send a signal to stop charging/discharging of said battery. This may be in the form of a signal to an external device such as a load or load controller controlling load on the battery or an external charger. Equally, the charger or load controller may be part of the system.

When an exception is raised, the battery monitor may generate an alert for an operator or generate an entry in a log. Even if the exception does not result in the system shutting down charge or discharge, it may still be important to warn an operator of an issue and provide a log for maintenance personnel to consider.

Preferably, the temperature of each cell is monitored by at least one temperature sensor. The temperature sensor is preferably provided on an electrode of a cell. The electrodes generally have good thermal connections to the cell and so can provide an indication of the temperature situation of the cell as a whole.

The temperature sensors may be provided on a connection such as a strap or bus bar connecting one cell to another cell. This may be in addition to or instead of sensors on the electrode.

The temperature sensors may be connected to the battery monitor by a respective wire. Whilst this may involve a number of wires, it provides a simple way of connecting the sensors whilst electrically isolating the sensor wires from the main electrical system. The wiring is all low voltage unlike voltage monitoring or active balancing connections, thus reducing shock hazard and risk of arcing.

The temperature sensors may instead be connected to a common communication bus for communicating with said battery monitor. This allows a reduced set of connections with a single bus cable passing from one sensor to the next rather than a dedicated connection from each sensor to the main monitoring point.

The temperature sensors may communicate wirelessly with the battery monitor. In this arrangement, the sensors are preferably powered by received electromagnetic radiation. This is similar to passive RFID tags where the RF radiation is used energise the temperature sensor which can provide a temperature reading in a returned RF signal. This is advantageous in that no wires are needed to connect them reducing further any issues with loose connections etc.

Preferably, each temperature sensor has a unique identifier which is communicated to said battery monitor with the temperature information signals. This allows the monitor to identify the specific sensor and potentially adapt its behaviour based on the sensor position. For example, if the monitor knows that a sensor on a cell is in the middle of the battery then higher temperatures may be expected and acceptable patterns may be adjusted accordingly. Equally sensors on the outside of the battery may be susceptible to external factors such as ambient temperature.

The battery monitor may be arranged to raise an exception if it does not receive temperature information from all of the temperature sensors. In this way, if a temperature sensor fails for whatever reason, the system can respond in a fail safe manner. However, a limited number of sensors failing to respond may be accommodated. For example, some sensors may have a degree of redundancy such as by providing multiple sensors on each cell.

Each of the cells referred to above may be constructed as a plurality of cells (or sub-cells) connected in parallel. The cells may also comprise groups of sub-cells connected in series and/or parallel.

The rechargeable battery management system may further comprise a battery charger arranged to charge the battery autonomously over a plurality of charge cycles without requiring commands to terminate charging from the battery monitor. In other words, the charger can be independent and manage charging operations without interaction from the management system. The management system may only intervene when an exception is raised.

Alternatively, voltage monitoring may be retained and optionally only switched on for the last part of the charging process.

The present invention also provides a method of operating a rechargeable battery comprising: connecting a plurality of statically balanced cells in series; arranging the cell connections to impose a substantially identical load on each cell in use; and controlling the charging of the battery by terminating charging prior to the cells reaching their maximum state of charge.

The method preferably further comprises pre-qualifying the cells prior to inclusion in the battery, wherein the pre-qualifying includes selecting the cells from a plurality of candidate cells and excluding candidate cells having soft shorts. The pre-qualifying of each cell preferably comprises discharging the cell, monitoring the cell voltage over time and disqualifying cells which show a drop in cell voltage.

Arranging of the cell connections to impose a substantially identical load on each cell in use preferably includes arranging each cell to connect the cell terminals only to the terminals of adjacent cells with no other connections to the cell terminals other than at each end of the battery.

Alternatively, arranging the cell connections to impose a substantially identical load on each cell in use, may include preventing any load current being drawn from the cells at intervening cell terminal connections between the ends of the battery.

Preferably, arranging of the cell connections to impose a substantially identical load on each cell in use includes providing connections to the cells other than at each end of the battery and controlling the current drawn from each cell to be identical to the current drawn from each other cell.

Controlling the charging of the battery by terminating charging prior to the cells reaching their maximum state of charge may comprise charging the battery using an initial charging current controlled charging phase followed by a charging voltage controlled phase, and terminating charging during the charging voltage controlled phase when said charging current falls below a first threshold.

Preferably, said battery charging current is controlled to be a substantially constant value during said battery charging current controlled phase.

The first threshold is preferably determined based on the cells of the battery to prevent the individual cell voltages deviating from each other.

The first threshold may be between 50% and 95% of the charging current at the start of the charging voltage controlled phase. Preferably it is between 70% and 90% and more preferably between 75% and 85% of the charging current at the start of the charging voltage controlled phase.

After controlling the charging of the battery to terminate charging, the method preferably includes carrying out one or more additional charging periods in which charging is restarted after a rest period and charging is again terminated. Preferably, the rest period has a duration of between 2 and 15 minutes.

The method preferably further comprises controlling charging, during said one or more additional charging periods, using battery voltage control and terminating charging when said charging current falls below a second threshold value.

The second threshold value may be the same as the first threshold value. Alternatively the second threshold may be selected to be in the range 50% to 95% of the initial CV phase charging current. Preferably it is between 70% and 90% and more preferably between 75% and 85% of the charging current at the start of the charging voltage controlled phase.

The rest period preferably ends when the battery voltage drops below a rest voltage value.

The invention further provides a method of operating a rechargeable battery comprising: connecting a plurality of statically balanced cells in series to form said battery; charging the battery during a current control phase by controlling the battery charging current; charging of the battery during a cell voltage control phase, after said current control phase, including determining a maximum cell voltage value, being the cell voltage on one of said plurality of cells having the highest cell voltage and controlling the battery charging current to the battery, to maintain the maximum cell voltage value at a target value.

Charging during the cell voltage control phase is preferably terminated when said charging current falls below a third threshold value.

The third threshold value may be between 2% and 15% of the charging current at the start of the charging voltage controlled phase.

More preferably, the third threshold value is between 4% and 6% of the charging current at the start of the charging voltage controlled phase.

The method may further comprise providing a plurality of temperature sensors, each arranged for sensing the temperature of at least one of said cells, the method further comprising operating the battery by: monitoring the temperature of each temperature sensor; determining if the monitored temperature of each temperature sensor conforms to an acceptable pattern; and raising an exception, if it is determined that the monitored temperature of one or more of the temperature sensors is does not conform to said acceptable pattern.

The acceptable pattern may be as described above.

The method preferably comprises monitoring the temperature of each cell using at least one temperature sensor. The temperatures of each cell are preferably measured by measuring the temperatures of electrodes of each respective cell using temperature sensors on each said electrode.

Alternatively, the temperatures can be measured on connections provided to connect one cell to another cell using temperature sensors on each said connection.

The method preferably comprises each temperature sensor communicating temperature information by a respective wire. Alternatively, the temperature sensors may communicate with the battery monitor using a common communication bus or wirelessly.

For wireless sensors, the method may include emitting electromagnetic radiation for reception by the temperature sensors to provide a power source for communicating said temperature information.

Each temperature sensor may communicate a unique identifier to the battery monitor with the temperature information signals.

The method may further comprise discontinuing charging or discharging of the battery, if temperature information is not received from all the temperature sensors.

Raising an exception may include or cause discontinuing charging/discharging of said battery.

The cells are preferably statically balanced by bottom balancing the state of charge of the cells individually. Bottom balancing allows the method and system to determine a uniform level of charge when the cells are discharged. Any variance in the charge capacity of cells will present itself when the cells are close to full charge but with the present invention, charging is terminated before full charge to avoid this region of operation. In this way, the cells can be more fully discharged without risking any one cell being reversed and potentially damaged.

After the cells are statically balanced, the method may include carrying out a plurality of charging and discharging cycles before balancing the cells again. The invention does not require balancing on each charge/discharge cycle and so a number of such cycles may be carried out without the state of charge of cells diverging from each other. This may be hundreds of cycles or more, due to the careful management of charge through each cell.

The method may further include discontinuing charging/discharging of the battery when an exception is raised.

DESCRIPTION OF THE DRAWINGS

The present invention will now be described in more detail with reference to the examples below and the attached drawings, in which.

DETAILED DESCRIPTION

Figure 2:
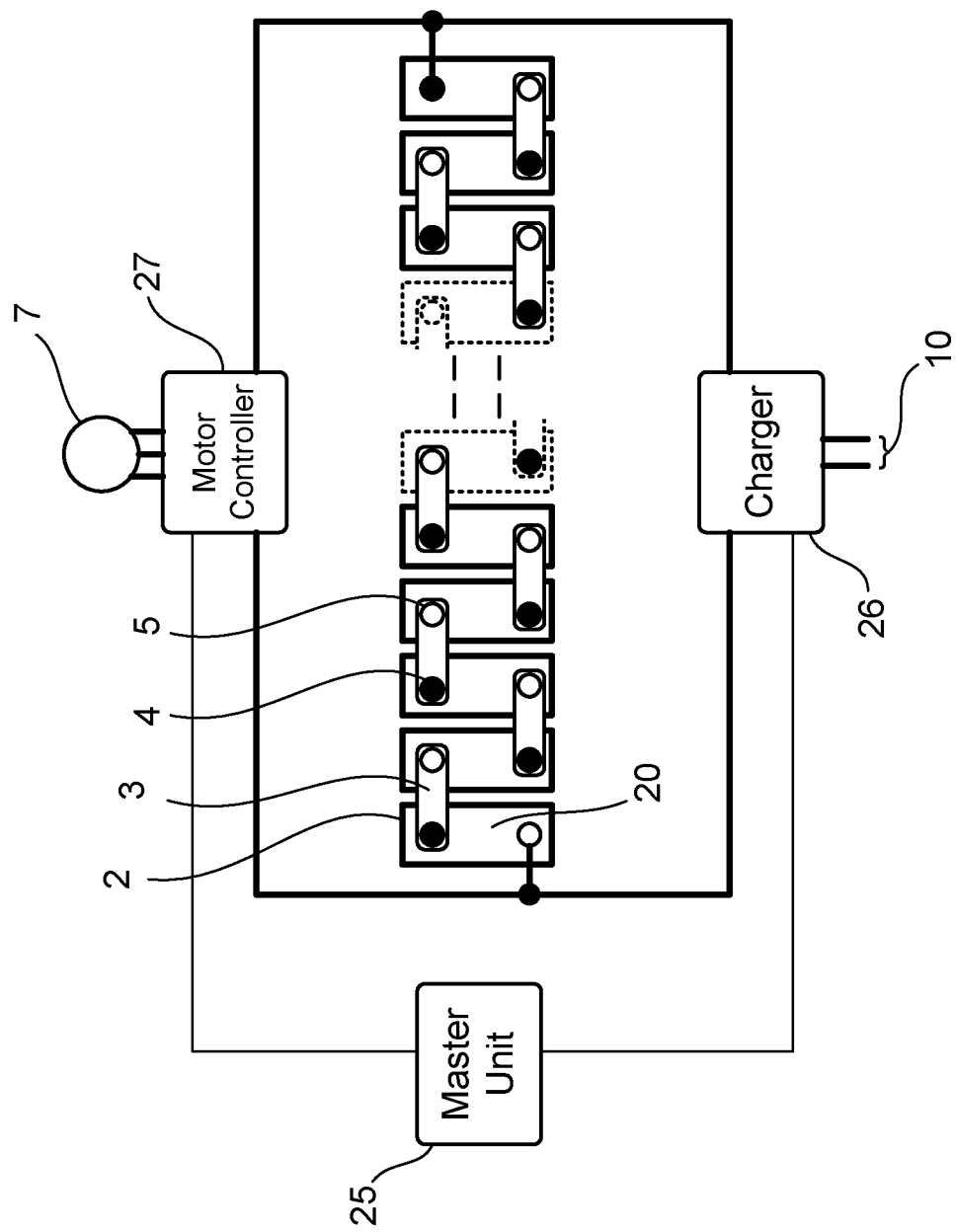
FIG. 2 shows a schematic layout of a BMS according to the invention.

FIG. 2 shows a rechargeable battery-based system with a plurality of cells 2 arranged in series with each other to form a battery. The cells 2 shown in FIG. 2 may represent either a single cell or a number of cells arranged in a cell module, usually with each of the cells arranged in parallel. Although not essential, the cells in this arrangement are bottom balanced prior to deployment. In this way, the cells will all be charged from a common charge level so that when they are discharged they will all discharge towards this initial bottom balanced level of charge, so that no one cell will be discharged beyond any other, avoiding the possibility of damaging one or more cells.

The end terminals of the battery are connected to a load which in this case is a motor controller 27 for controlling a motor 7. The motor controller and motor provide a load into which the battery is discharged in use. A charger 26 provides charge to the battery in order to recharge the battery as it becomes depleted.

The charger is usually configured to operate largely autonomously by monitoring the overall battery voltage, i.e. the voltage on the end terminals of the battery and using that information to determine whether and how charging is carried out. The charger can operate without reference to the individual cell voltages within the battery and so does not necessarily require individual connections to each of the cells within the battery to monitor and manage the charging of the battery.

The operation of the charger is relatively standard similar to that described above in relation to FIG. 7. This would typically start with a period of charging at a constant current until the voltage across the battery reaches a predetermined level. This is followed by a period of charging at a constant voltage.

Figure 8:
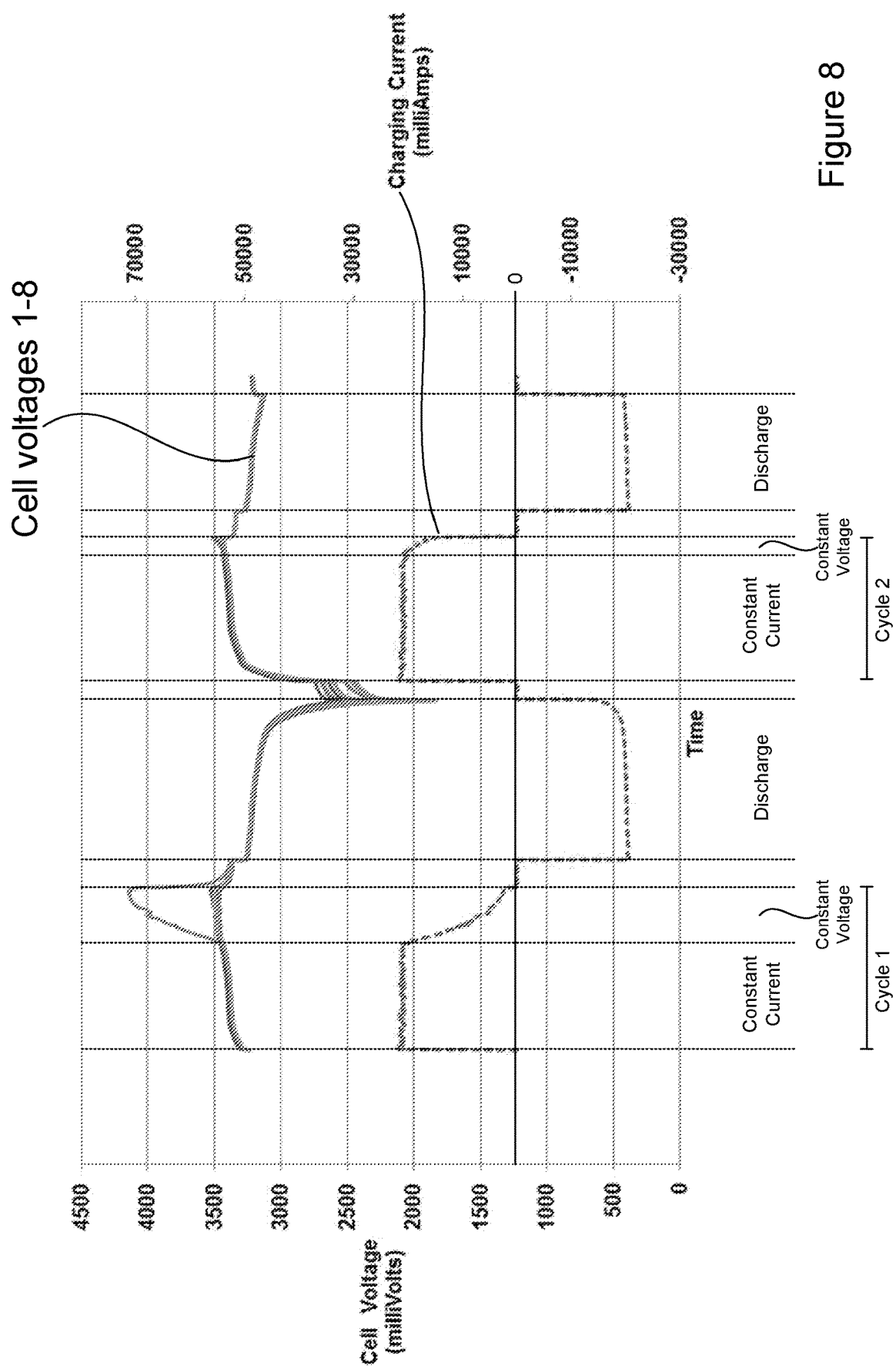
FIG. 8 shows the charging profile of a multi-cell battery with different charging regimes.

In a conventional active balancing BMS the constant voltage phase would be continued until the charging current falls below a set threshold, typically a few percent (5-10%) of the initial constant charging current. However, as shown in the first charging cycle (cycle 1) of FIG. 8, this kind of conventional charging profile can result in charging the battery such that the individual cell voltages on some of the cells start to diverge. In FIG. 8, the cell voltages of 8 cells are shown in the upper traces. In the first demonstration cycle, charging is continued through the constant current phase, and through the constant voltage phase until the charging current drops to below around 10% of the initial constant current charging current. In the second cycle of FIG. 8, the method of this embodiment is used, and the constant voltage phase is stopped sooner at around 80% of the constant current phase current.

As can be seen in cycle 1 of FIG. 8, using the conventional charging profile, the voltage of one of the cells diverges significantly from the other cell voltages during the constant voltage charging phase. This does not reflect a difference in state of charge as can be seen from the fact that the cell voltages converge rapidly during the rest period when no current is flowing. Cells typically have a stated voltage limit which should not be exceeded regardless of the cause. With the divergent voltage shown in cycle 1, there is a risk that it exceeds the maximum desirable voltage and may potentially cause damage to the cell. By terminating the charging in the constant voltage phase earlier, as in cycle 2, the charging is stopped before the voltages on any of the individual cells starts to approach its voltage limit.

As can be seen in the charging cycle 2 in FIG. 8, early termination of charge means there is virtually no divergence between the cell voltages compared to cycle 1 where at least one of the cells diverges considerably from the rest.

There are a number of ways in which this early termination (hereinafter the "battery charge termination point") can be established, depending on both the particular charging algorithm being used and the cell type. One suitable approach (illustrated in FIG. 8) is to use an empirically-determined percentage of the original constant-current charging current. In the example of FIG. 8, the CV phase is ended at around 80% of the original CC phase current although it may be typically in the region of 70 to 90% compared to the more typical 5 to 10%, which is typically used as the cut-off current for traditional charging devices.

Figure 7:
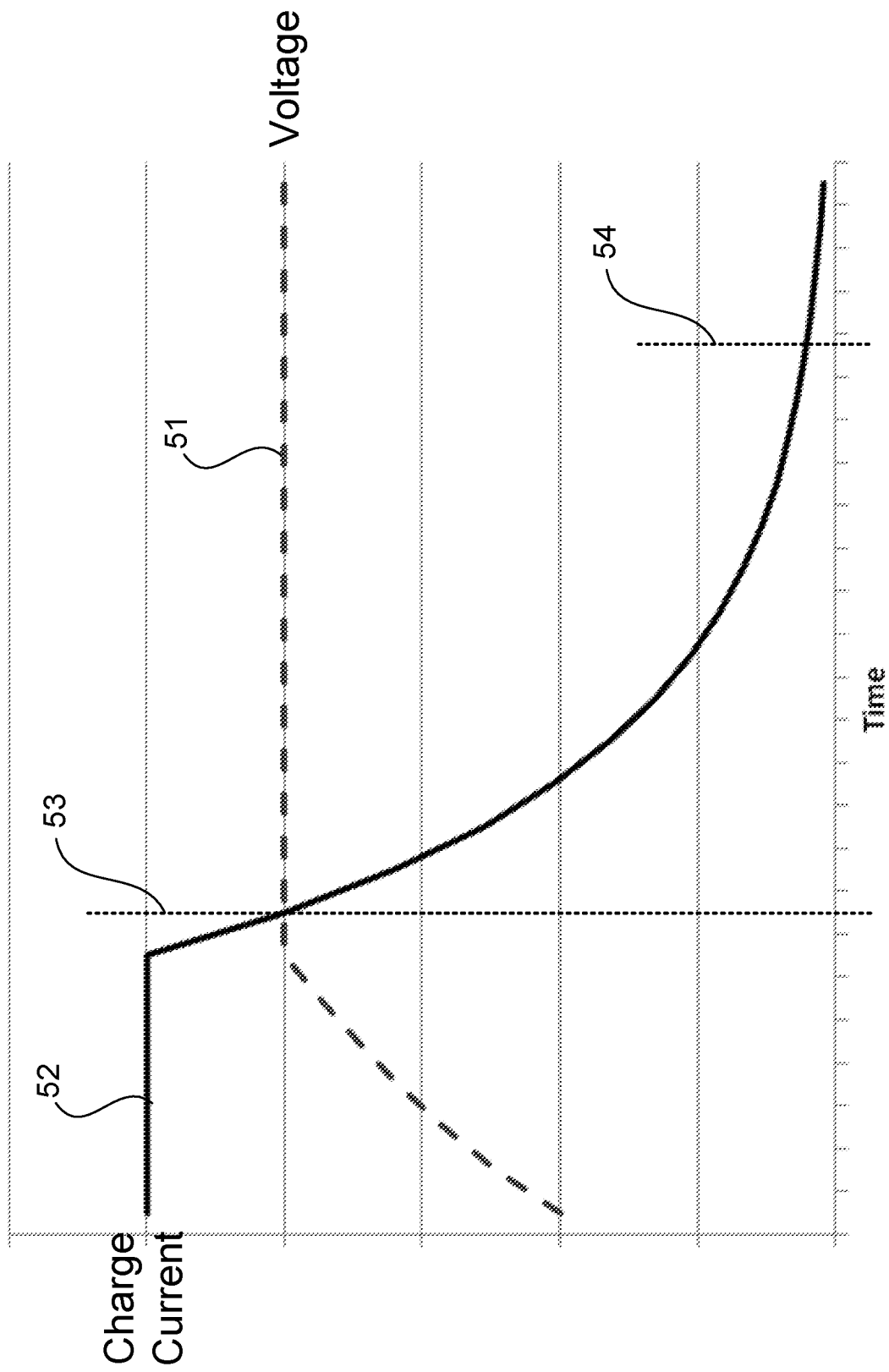
FIG. 7 shows a charging profile for a single cell.

The battery charge termination point may be varied according to the specific configuration used, as well as the type of cells being used. The cut-off current in this example would be selected so that it occurs before any significant variation in the voltages on the cells starts to occur. This is illustrated in FIG. 7, where curve 51 is the charge voltage and curve 52 is the charge current. The line 53 is the battery charge termination point, at approximately 80% of the charge current in the constant current phase. For comparison, conventional charging in an active balancing BMS might terminate at point 54, i.e. at around 5% of the charge current in the constant current phase.

As noted above, the divergence in the voltage seen between cells tends to be a temporary phenomenon, as demonstrated in cycle 1 of FIG. 8, where after charging stops, once the constant voltage phase has ended, the voltage tends to revert to a level more consistent with that of the other cells, even on the highly divergent cell. In the above, once the charging has been stopped, no further charging will take place until the battery has been discharged, at least partially.

The above procedure will charge the battery to a very good level of usable capacity, close to the maximum capacity but clearly less than would be achieved if charging was continued until the charging current had dropped to the more typical 5% level. Whilst this ensures that the battery is not damaged due to charging when cell voltages diverge, a higher level of charge is often desirable. As such, the above procedure may be modified to restart the charging process after it has been stopped. This might be a single period of supplementary charging or a series of additional supplementary charge cycles. Each of the one or more short supplementary charges would include a rest period (of typically 2 to 15 minutes) in between, to allow the cell voltages to recover before restarting. These additional supplementary charges can help to achieve more complete charging whilst still ensuring battery reliability and avoiding cell damage.

Figure 3:
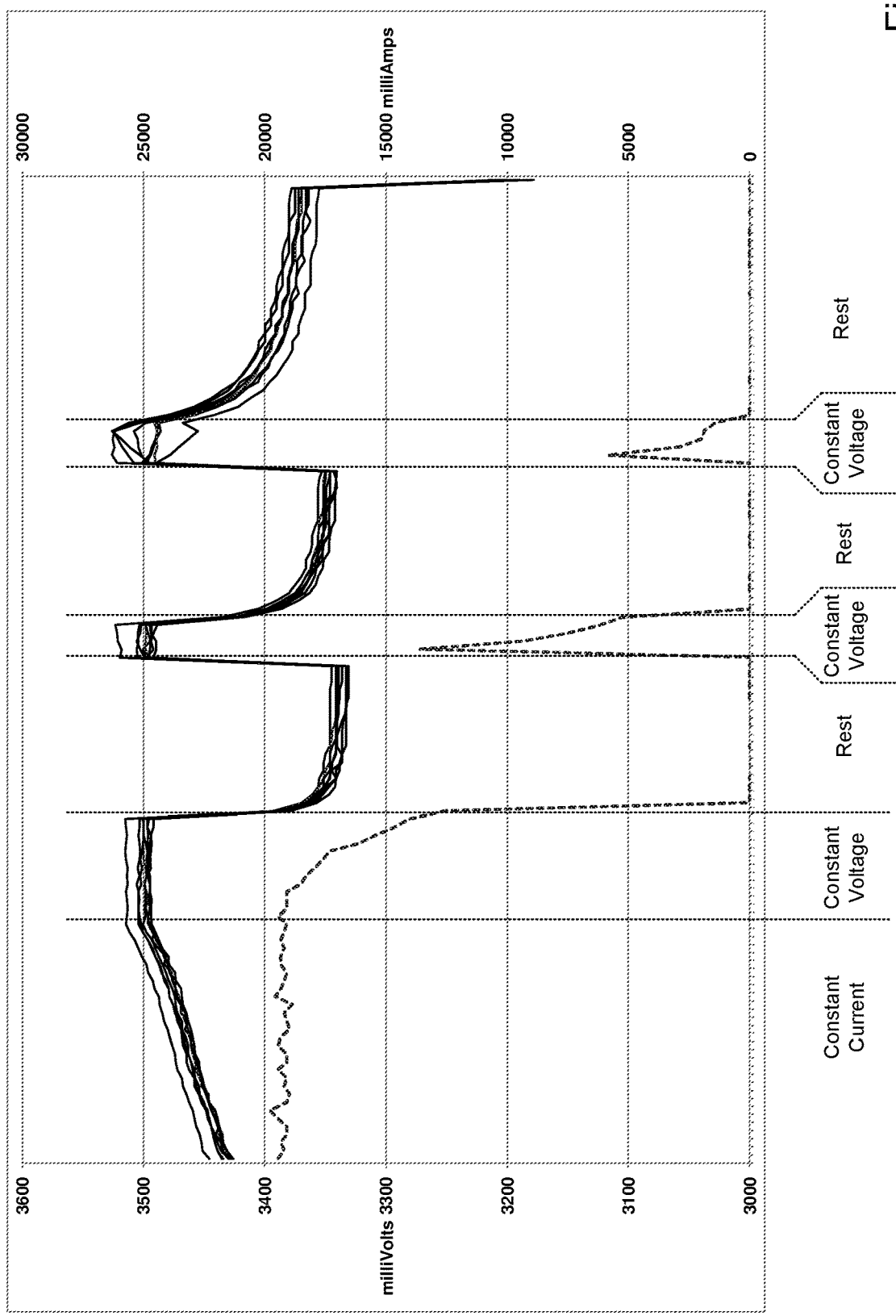
FIG. 3 shows a series of supplementary charging cycles with rest periods.

FIG. 3 shows a typical operating profile for a series of supplementary charging cycles. Initially, the battery is charged using a constant current phase, which can be seen where the dotted current curve is generally flat at the left of FIG. 3. The voltage on the cells rises during this phase. Once the battery voltage reaches a predetermined level, the CC phase ends and the constant voltage phase begins. This is apparent from the decline in charging current. As before, the charging is terminated when the charging current declines to around 70% of the CC phase current. By terminating the charge early, there is relatively little divergence of the cell voltages. As can be seen in FIG. 3, although the cell voltages are not identical, the differences are largely constant.

Once charging is terminated, the current drops to zero and the cell voltage drops due to the absence of charging current. However, over time, the voltages drop further as the cells recover during the "Rest" period. This allows any divergence in the cell voltages that may have been developing or about to develop to recover so that the cell voltages become less divergent. After a period of time (Rest), the cells are sufficiently rested and their individual voltages tend to stabilise. This period may be typically around 5 to 15 minutes but may be more or less depending upon how long it takes for the cell voltages to recover. The preferred delay before restarting charging will depend on the properties of the cells such as the size and chemistry but also on the charge rate.

Charging is then restarted with a constant voltage phase. The cell voltages rise again as additional charge is added to them. The duration of the charging period will be relatively short, as shown in FIG. 3. During the Rest period the voltage will have sagged, so when constant voltage (CV) charging is restarted with the same target voltage, the current will be higher than when the charging was terminated prior to the Rest period. During this period, the charging current will decline. Charging will continue, as before with a target constant voltage and then cut off at 70% of the original constant current. However, the cells have been rested and so the tendency for their voltages to diverge is reduced, compared to the situation if the charging had not been stopped for the rest period. This allows additional charge to be added to the batteries without the undesirable divergence of the cell voltage leading to possible damage.

The charging in this example is cut of at 70% of the original (CC phase) charging current. However, in other embodiments, this may be selected to be the same as the termination current at the end of the CV phase or independently determined. For example, it may be set at a different current level, typically in the 50% to 95% range.

Again, charging is terminated, a further rest period is allowed so that the cell voltages can again recover and stabilise. A further charging cycle may then be used with CV charging. As can be seen in FIG. 3, the cell voltages in this cycle are becoming more divergent. However, the divergence seen will tend to be less than if the charging had not been paused. At this stage charging is terminated and not restarted to prevent further cell voltage divergence leading to damage or imbalance. However, one or more additional charging periods may be used if cell voltage divergence is not as significant as shown in FIG. 3 or if the level of divergence is not likely to cause damage or imbalance.

FIG. 3 shows that the final cell voltages (in the rest period after charging has stopped) are higher than if charging had been stopped and not restarted and the charge level will be much closer to the charge level achieved under conventional charging to 5% of the CC current level. However, this is achieved with a much reduced risk of damage to the cells by overcharging any one cell.

Whilst a top balancing BMS is preferably controlled to terminate discharge early to protect the weakest cell in the battery from over-discharging, it is preferable to terminate charge early in a bottom balanced pack for similar reasons. The advantage of the bottom balanced approach, as indicated earlier, is that the risk of cell damage by over-discharge is greatly reduced, allowing the user to take a less conservative approach to the termination of discharge.

In a conventional BMS, the individual connections 8 to each of the cells provide an indication of the voltage on each cell to the master unit 1. In the arrangement of FIG. 2, the charger simply refers to the voltage across the entire battery without the need to measure the individual cell voltages. This allows the charger to operate largely autonomously, primarily relying on the voltage and current on its outputs connected to the battery. This is in contrast to the arrangement in FIG. 1 where the charger and master unit 1 must work together to control charging. The master unit has access to the individual cell voltages which are needed to control the charging carried out by the charger. If either unit fails then proper operation of the BMS may fail and charging may continue under fault conditions leading to a catastrophic failure such as a fire or explosion in the battery.

In the arrangement in FIG. 2, the charger does not need information from the master unit 25 to carry out normal charging operations. The master unit only needs to interact with the charger if a fault or exception condition occurs.

Figure 4:
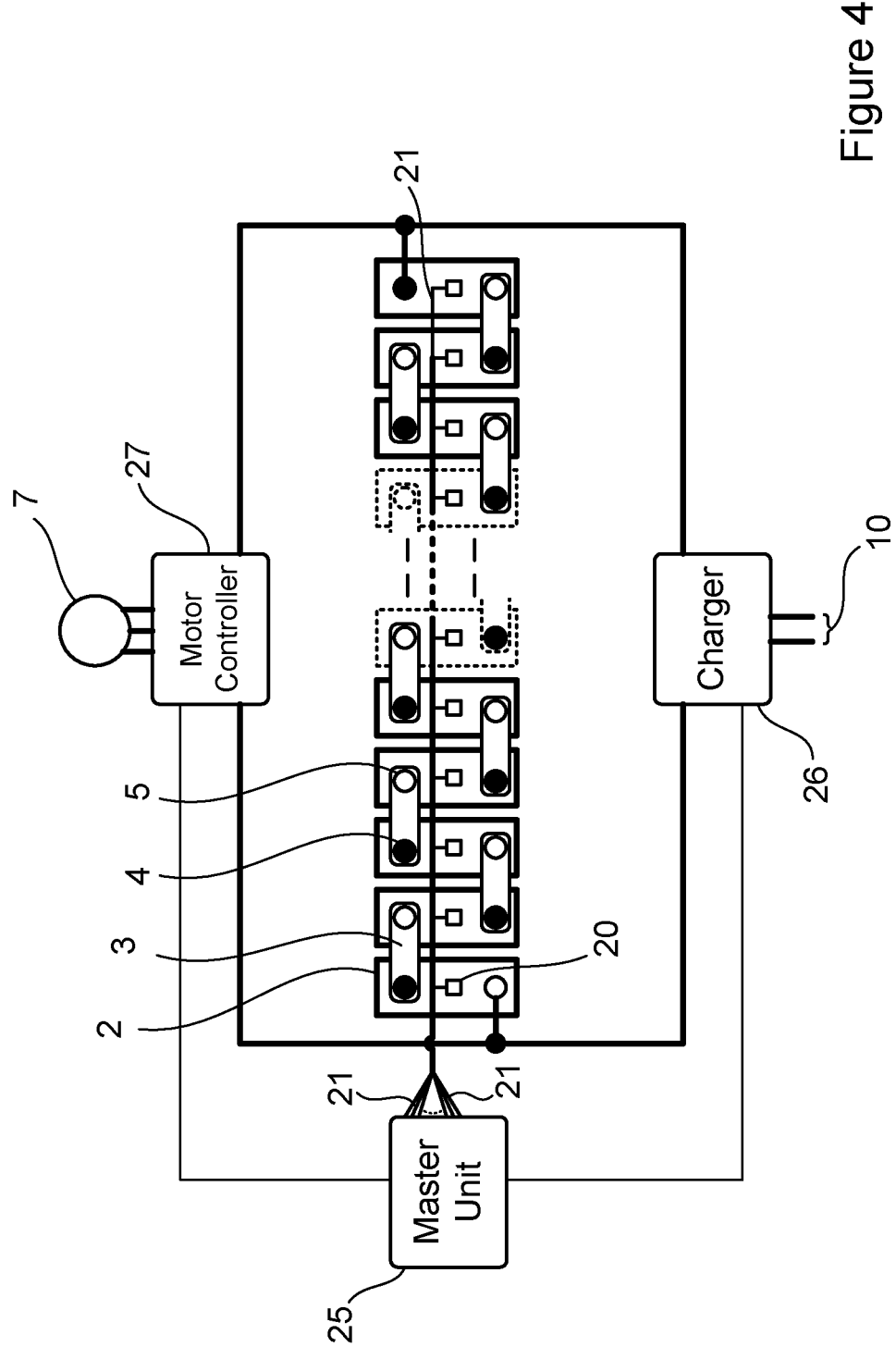
FIG. 4 shows a schematic layout of a modified BMS.

FIG. 4 shows a modified arrangement of that show in FIG. 2. The master unit 25 has individual connections 21 (shown bundled together in the figure but they may be laid out independently) to temperature sensors 20 arranged on each cell for monitoring the terminal temperatures of each cell. Otherwise, the arrangement is similar to that of FIG. 2. It will be appreciated that other configurations of the temperature sensors are possible. For example, temperature sensors may be arranged between two cells for monitoring both cells simultaneously or each cell may be provided with more than one temperature sensor to monitor different parts of the cell. The temperature sensors may also be mounted in different locations such as on the cells themselves or on the cell straps 3. The temperature sensors may also be provided within the cell or on the outer surface.

Where a cell is a cell module comprising a number of individual cells then the temperature sensor may be arranged on one of the cells or in contact with several of the cells or there may be multiple sensors for monitoring the temperature of all the cells or a significant number of them. In FIG. 4 a single temperature sensor 20 is provided for each cell 2.

The master unit 25 monitors the temperature measured by each temperature sensor 20 to determine if the temperature "signature" conforms to an acceptable pattern. This determination may involve: assessing whether the absolute value of measured temperature exceed specific thresholds; identifying characteristic patterns of absolute temperature values (T), rates of temperature change (dT/dt) outside of acceptable ranges; identifying changes to the rate of change ($d^2T/dt^2$) and so on.

Calibration of the master unit may be based on absolute temperature values, or variable values, adjusted for the point in the charge/discharge cycle or other factors such as charge/discharge current. They may vary depending upon a number of other factors such as the stage of charge, the temperature of the environment, the average temperature of the cells within the battery, the temperature of adjacent cells and so on. In this way, if the temperature of one cell deviates significantly such that it falls outside of the determined tolerance range, this might be indicative of an anomalous situation requiring action to be taken by the master unit. This anomaly may range from a simple issue such as loss of balance in the pack, to more serious faults including potentially catastrophic failures.

For example, analysis of temperature signatures of this kind can detect an out of balance condition caused by exceptional circumstances such as foreign material in the pack or a cell defect that escaped the qualification process.

The internal impedance of a cell typically rises as it approaches the fully discharged state. The cells in a battery that is being discharged will normally heat up slightly, due to current flow through a resistance: the so called $I^2R$ losses. Because the internal impedance rises as the cells approach full discharge, the $I^2R$ losses will also increase. A cell that is approaching a fully discharged state earlier than its peers will therefore have an anomalous temperature signature.

Figure 9:
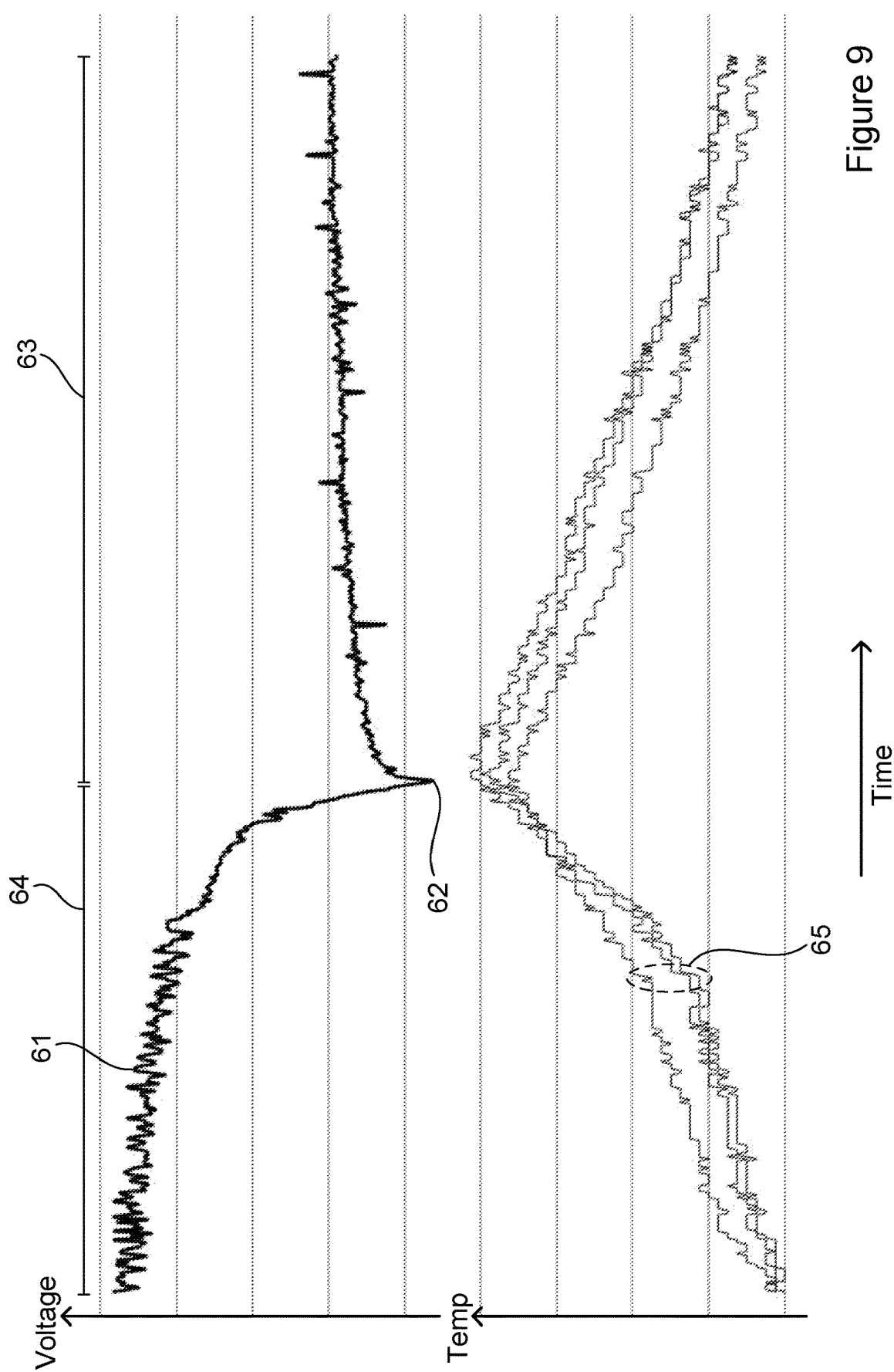
FIG. 9 shows a typical diagnostic temperature signature during discharge of a battery.

This is illustrated in FIG. 9 (taken from actual temperature and voltage recordings for discharge of a three-cell pack). FIG. 9 shows a first period 64 during which the battery is being discharged followed by a period 63 after discharge has stopped. The battery pack voltage 61 declines during discharge until it reaches a value 62 at the end of discharge. During a rest period 63, after discharge period 64, where no current is passing through the cells, the gradual recovery of pack voltage can be seen.

The lower graph shows the temperature increment above ambient of the positive terminal of each of the three cells in the pack. The temperature is rising during discharge as a result of $I^2R$ losses. Note however at point 65, even though the terminal temperatures are different, all three temperature curves show a marked inflection at the same time: the rate of increase in temperature goes up relatively suddenly as the increased impedance near the end of discharge takes hold. Any difference in the timing of the point of inflection would indicate an imbalance.

This is a simple example of a continuous discharge for illustration. Even with a more complex discharge pattern, typical of real world use, it would be possible to identify cells where the "rate of change of rate of change" of temperature 'T' with time 't' (mathematically $d^2T/dt^2$) was greater or less than its peers.

An important feature of this arrangement is that if the cells in a battery for any reason lose balance at any time, but their SoH is unaffected, the specific thermal response of the affected cells during charge and discharge will enable an appropriate warning to be issued to rebalance the battery as a service item. This feature, which is distinct from the safety-related warning systems, makes it unnecessary for the BMS to incorporate complex cell voltage monitoring apparatus.

A number of different criteria might be used to determine when a temperature exception has occurred in a cell. The master unit 25 may raise an exception if any terminal or cell temperature was more than a parameterised amount above or below the average. Again the master unit 25 may raise an exception if the rate of change of temperature of any terminal or cell was more than a parameterised amount above or below the average.

An exception may also be determined if any terminal or cell temperature was outside a parameterised absolute value range or if the rate of change of temperature of any terminal or cell was outside a parameterised absolute value range. In the above examples, where the terminal temperatures are used, cathodes and anodes could be grouped separately.

In response to an exception the master unit may take any number of actions from shutting down charging or discharging completely, to simply registering a fault on an automated system. It may also reduce the maximum allowable discharge, i.e. switch to a low power mode or "limp mode" in an EV context. Other steps may include different levels of passive or active response. For example, a passive response might include a warning issued to an operator (or EV driver) which may include various levels of urgency from an alarm requesting an immediate stop to a gentle warning that remedial action might be required in the future.

Detection of an exception would trigger the master unit to identify the parameters at the time of the event which might include the temperature measured, temperatures of other cells such as the adjacent one or the average for all cells.

Other parameters might include the current status of the battery such as the level of charge/discharge, the current flow and voltage etc. The parameters could be used to reference look-up tables specific to the battery pack and the cell chemistry to identify the appropriate action. For example, the look-up table may comprise a three dimensional matrix based on the battery pack with one axis for pack voltage, the second covering fault severity and the third holding a threshold temperature/temperature variance at each node.

In an illustrative example, in a battery operating at 200 amps and 300 volts, a level 1 fault would be a threshold value of 2 degrees above mean, and a level 10 fault might be an absolute temperature of 100 degrees. A further refinement would be to add a fourth dimension to the matrix reflecting the time above the threshold. In the above example, the level 1 fault would only be recorded if it persisted for 10 seconds. The parameter tables would be akin to the ignition mapping in a modern motor vehicle.

Such exceptions or anomalies may arise as a result of any type of cell distress such as: overcharging; over-discharge causing a voltage reversal in the cell; failure of the cell, e.g. resulting from internal shorts; overheating caused by loose connections between the cells in the battery or within the cells themselves; etc. In many circumstances the temperature of the cell provides a much more reliable indicator of cell distress than reference to the cell voltage. In general, the cell voltage may not change significantly or there may be a significant delay before a voltage change occurs as a result of some anomaly in the cells of a battery. By monitoring cell temperature, the master unit can detect a broader range of anomalies than by monitoring the voltage of the cells within the battery. Furthermore monitoring the temperature means that anomalies can often be detected and identified more quickly and effectively than by monitoring the voltage.

As the temperature monitoring sensors are effectively electrically isolated from the cells and charging arrangement, they impose no electrical load on the individual cells (although of course the master unit may be powered from the output of the entire battery).

The master unit 25 expects to receive temperature readings from each of the temperature sensors 20. If it fails to receive a temperature reading from one of the sensors then this may be considered a serious anomaly and similar action to a high temperature reading may be taken, i.e. shutting down the charger or stopping discharge by removing the load. The failure of a temperature sensor to report a temperature could be as a result of the sensor being damaged by excessive heat or mechanical trauma, both of which would be good cause for shutting down the battery.

In this way, the master unit has a failsafe arrangement such that unless it receives valid temperature readings from each of the sensors, it will consider an anomalous situation to be occurring and take appropriate action. A similar failsafe mechanism may be utilised in respect of the communication between the master unit 25 and the charger 26 and between the master unit 25 and the motor controller 27. In this way, the charger may only operate if it receives a signal from the master unit confirming that the master unit is operational and in communication with the charger. This may be in the form of a simple voltage level or a periodic "ok" message or some other signal to indicate that the master unit is operational and is receiving valid signals from each of the sensors 20.

Similarly, the motor controller 27 may receive periodic "ok" messages from the master unit 25 providing similar confirmation. If the charger 26 or the motor controller 27 does not receive appropriate confirmation of the operation of the master unit then they may be arranged to cease charging or discharging of the battery respectively. Thus again, unless the master unit is receiving valid temperature signals for each of the cells and indicating this to the motor controller and charger 26, they can be arranged to shut down to prevent possible damage to the battery by continuing to operate.

The arrangement of FIG. 4 still requires a significant number of connections 21 to be provided to each of the temperature sensors 20 on the cells. Providing these connections and ensuring that they are reliable introduces complexity into the manufacturing process and also a possible failure mode for the battery, if one of the connections should subsequently fail. This problem is also present in traditional BMS where voltage sensing connections to each of the cells are provided. However, the temperature sensing connections are not part of the electrical infrastructure of the battery and cells and so if one of the connections does fail or becomes loose, it will tend to be physically separated from the electrical connections to the cells and so less likely to cause short circuits within the cells. Furthermore, the connections will tend to be to temperature sensing elements and so will be low power/low voltage wires and so a short to one of the cell terminals is unlikely to result in potentially harmful high currents.

Figure 5:
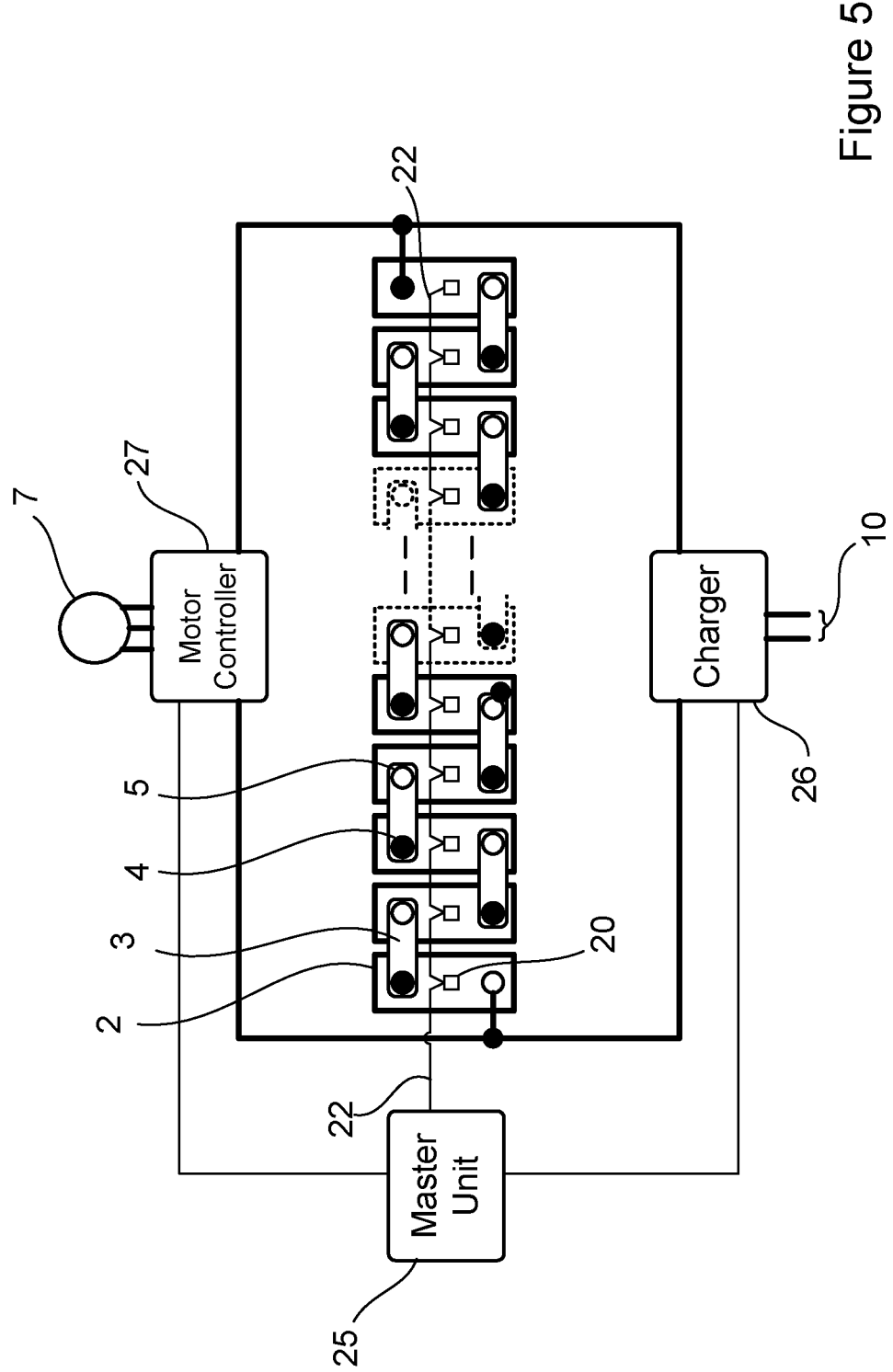
FIG. 5 shows a schematic layout of a BMS with a modified connection system.

However, it may still be desirable to try to avoid large numbers of connections within the battery. FIG. 5 shows an alternative arrangement in which rather than having a separate connection between the master unit 25 and each of the temperature sensors 20, the temperature sensors 20 are connected sequentially such that a single connection 22 passes from the master unit 25 to the first sensor and then on to the second sensor and then on to the third sensor and so on. In this way each sensor 20 is connected to its neighbours rather than each sensor being connected by a separate wire to the master unit 25.

With this arrangement, the single connection 22 would act as a communication bus (or microLAN) along which each temperature sensor can report readings back to the master unit 25. The connection 22 could be a simple two or three core cable. The connection 22 may even be a single core cable using the grounded metal chassis as a return path.

Each temperature sensor 20 can use the communication bus over the connection wire 22 to report its determined temperature. This information may also be accompanied by an identification of the individual temperature sensor so that the master unit 25 can identify which temperature reading has been received from which temperature sensor.

Identification of the sensors is not essential and the sensors may simply report their temperature as a value and if any of the received temperature values falls outside the parameters set, the master unit may respond, for example by shutting down the charger 26 or motor controller 27, without identifying which specific cell is the cause.

The temperature sensors may provide their temperature readings to the master unit 25 periodically. The rate at which the temperature is reported will depend upon how rapidly the master unit needs to respond to temperature changes. If a temperature sensor 20 fails to provide a temperature reading within the predetermined period then the master unit 25 may determine that the temperature sensing unit 20 has failed and respond in a similar way to that described above, e.g. providing a signal to the charger or motor controller to cease charging or remove the load from the battery respectively.

The sensors may be relatively simple or may include additional functionality so that in addition to providing temperature and identification information it may, for example, receive information about acceptable temperature ranges from the master unit 25 so that it can determine whether or not its measured temperature is within the acceptable tolerance and simply report whether or not the measured temperature is within the acceptable tolerance range. This would simplify the communication between the temperature sensors and the master unit 25 as it would only be necessary to transmit whether or not the sensor measured temperature is within the range (and optionally the sensor identification). Equally the temperature thresholds could be broadcast to all the sensors along the connection 22 rather than to each sensor individually.

Figure 6:
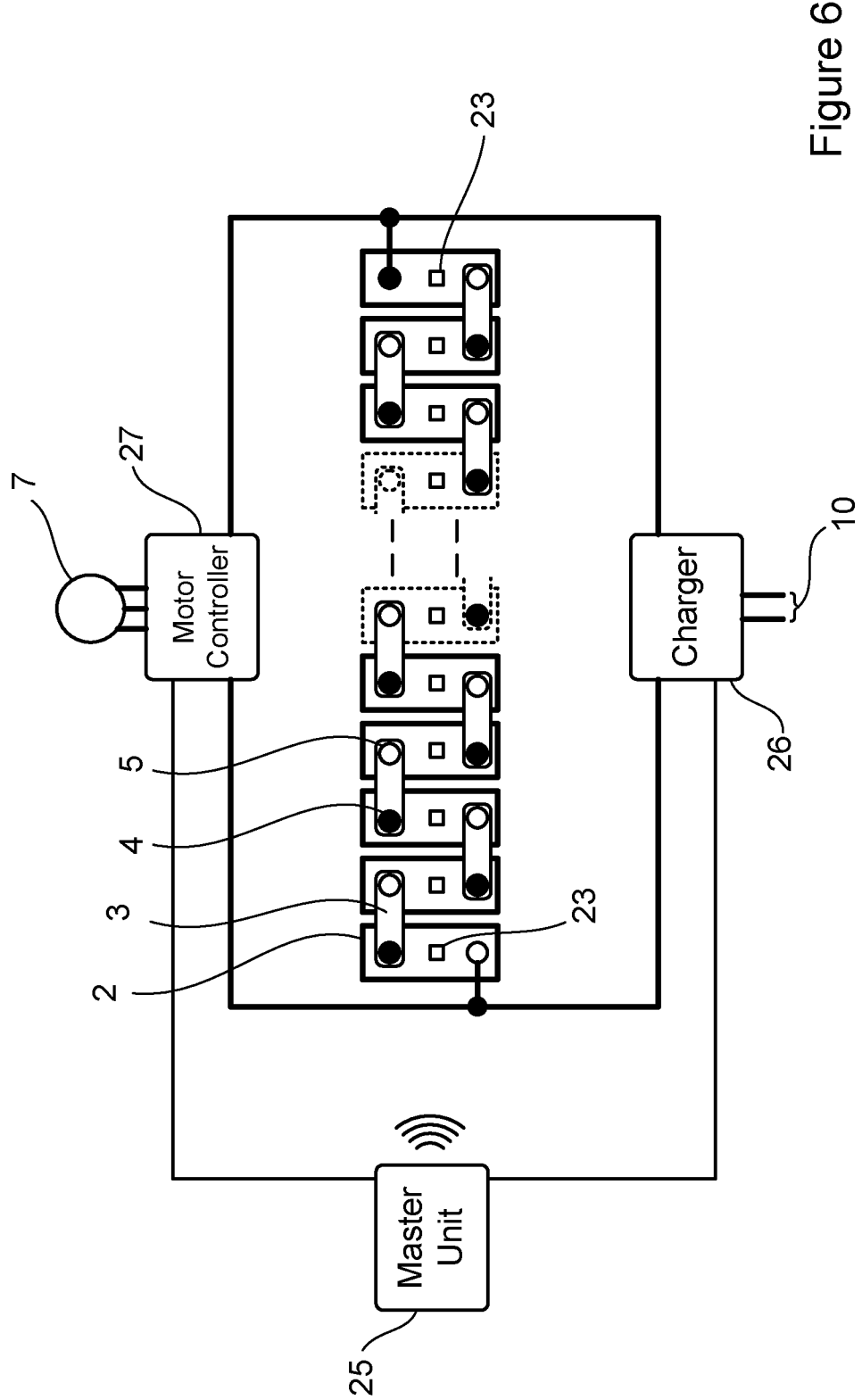
FIG. 6 shows a schematic layout of a BMS with a wireless connection system.

FIG. 6 shows a further alternative arrangement which replaces the temperature sensors 20 with wireless temperature sensors 23. In this arrangement, the individual temperature sensors 23 are able to communicate wirelessly with the master unit 25, avoiding the need to have a communication connection between the temperature sensors and the master unit 25. This helps to further simplify the construction of the battery as the temperature sensors can be provided on the cells without having to provide any connections within the battery and which extend to the exterior of the battery.

The temperature sensors may be low power devices which are energised by polling them with radio frequency signals similar to those used on RFID tags. The master unit 25 would broadcast a radio frequency signal which would be received by the temperature sensors 23. The received radio frequency energy is stored to provide a source of power for the temperature sensor 23. This allows the temperature sensor to determine the temperature of the cell and broadcast the information back to the master unit, indicating the measured temperature. Again, the unit would ideally identify itself with an identification code so that the master unit can determine that it has received a response from each temperature sensor and also to avoid interference with the temperature sensors in other battery devices nearby.

In each of the arrangements described above, the master unit can communicate with the charger or the motor controller to provide information including the possibility of the need to shut down and stop charging/discharging. Although, in the above arrangements, individual connections are provided between the master unit and the motor controller unit and charger respectively, all three devices may be connected over a common bus or similar connection e.g. a CAN or LIN bus in an EV. This would allow the master unit to broadcast messages to the other devices.

The master unit may periodically broadcast messages indicating its state, to confirm that it is active and operating correctly, as described above. If these broadcast messages cease to be received by the charger and motor controller or messages are not received within an appropriate interval, then they may be arranged to shut down.

The charger or motor controller may alternatively periodically poll the master unit 25 to determine if it is still operating correctly. In other words, rather than the master unit periodically broadcasting a message saying that it is operating correctly, the individual units may send a query to the master unit which it then responds to.

In the above arrangements, individual cell voltage measurements are avoided which removes a significant source of parasitic load on the individual cells. As described above this kind of parasitic load can lead to an imbalance in the state of charge of individual cells relative to each other.

As described earlier, charge balancing is typically carried out in conventional battery management systems in the final stages of charging. In the present invention, this charge balancing can be avoided. It is difficult to carry out balancing without having reference to each individual cell's state of charge and rested open circuit voltage. It is therefore important to achieve good charge balance in the battery prior to installation.

Balancing can be carried out in a number of ways: actively or statically and at top or bottom of charge. For example, static top balancing can be used where the cells are individually fully charged prior to being integrated into the battery. However, static bottom-balance (as used in the example above) is preferred in which the cells are discharged to the same low state of charge. Once the cells have been bottom-balanced, they can be integrated into the battery. With the removal of the potentially unbalancing voltage measuring connections, the relative state of charge between the cells can be shown to be relatively constant over a substantial number of charge cycles comparable to the battery life. As a result balance can normally be maintained over the life of the battery.

As indicated above some cells may show different characteristics due to variations or defects during manufacture. These variations can lead to differing performance or operations between cells. Soft shorts can cause long term low level drain of charge leading to a lack of balance between cells. This problem can be mitigated by identifying and eliminating defective cells exhibiting soft shorts, prior to assembly of the battery and possibly at intervals thereafter, in order to ensure that the cells in the battery are of a consistent standard. This process of identifying and eliminating defective cells is referred to herein as "prequalifying".

Figure 10:
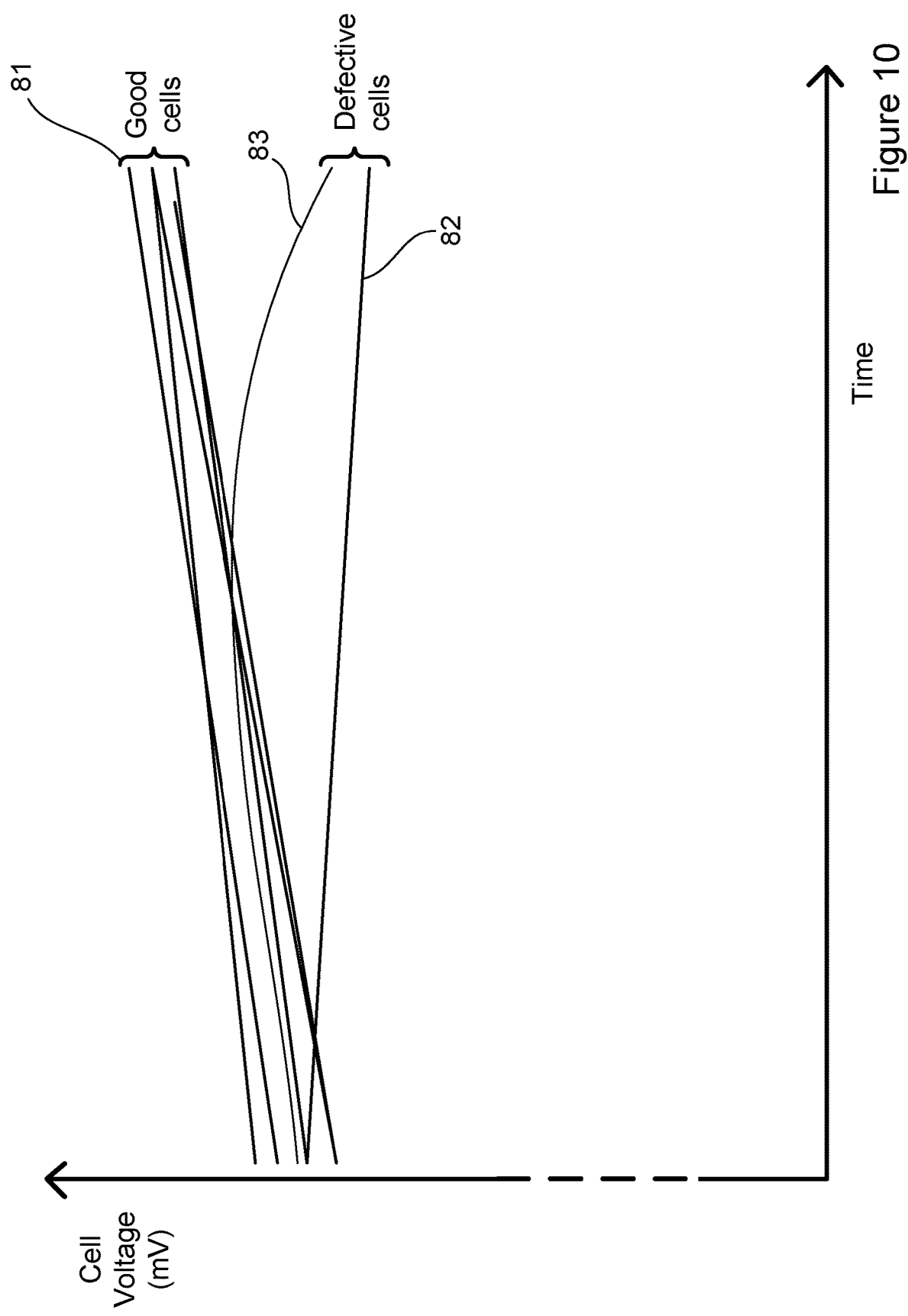
FIG. 10 shows the voltage trend of a number of resting cells.

Cells which are prone to self-discharging are not always immediately obvious, especially if the rate of self-discharge is slow. Such cells can however be identified during prequalifying in a number of ways. One way is to discharge the cells to a low voltage (for example to 2.7V for Lithium Iron Phosphate cells) and subsequently check the rested open circuit voltage over a period of 1-2 weeks. FIG. 10 shows schematically a typical voltage profile over time of a cluster of good cells 81 and defective cells (82, 83) showing a soft short. The good cells 81 will exhibit a gradual slight rise in voltage, often over a period of several days, and subsequently hold a constant voltage. Defective cells may also exhibit an initial rise (e.g. 83) in voltage but will then exhibit a gradual loss of voltage.

As indicated above, the avoidance of unbalanced loads on cells in the battery will reduce cell drift and hence the need for periodic rebalancing. Connections can be made to individual cells provided that care is taken to ensure that they are substantially identical, i.e. they do not introduce unbalanced loads such that drift on the SoC of individual cells impairs the performance of the battery to a significant degree or necessitates static balancing at inconveniently short intervals.

Although conventional voltage monitoring is done with high impedance measuring devices, they will still draw a small current. A typical architecture is for the voltage monitor to measure the difference between each cell junction and the battery pack negative, and to compute cell voltages by subtraction.

In the arrangements described above, individual cell connections measuring the voltage of individual cells are eliminated, ensuring no unbalanced load is applied to the cells. The invention may, however, be utilised with a battery where individual cell connections are provided. These connections would ideally be disconnected in normal use to avoid the parasitic loading due to measuring the voltage on the cells but may, for example, be used intermittently so as to determine the relative state of charge of the individual cells, possibly even to facilitate rebalancing of the state of charge as a maintenance activity if it becomes necessary. Furthermore, the voltage monitoring may be used in conjunction with extremely high input impedance measuring devices to keep any loading to a minimum. In this way, the temperature sensing elements provide the primary monitoring mechanism for monitoring the state of the battery but with the ability to measure cell voltages in addition.

Figure 1:
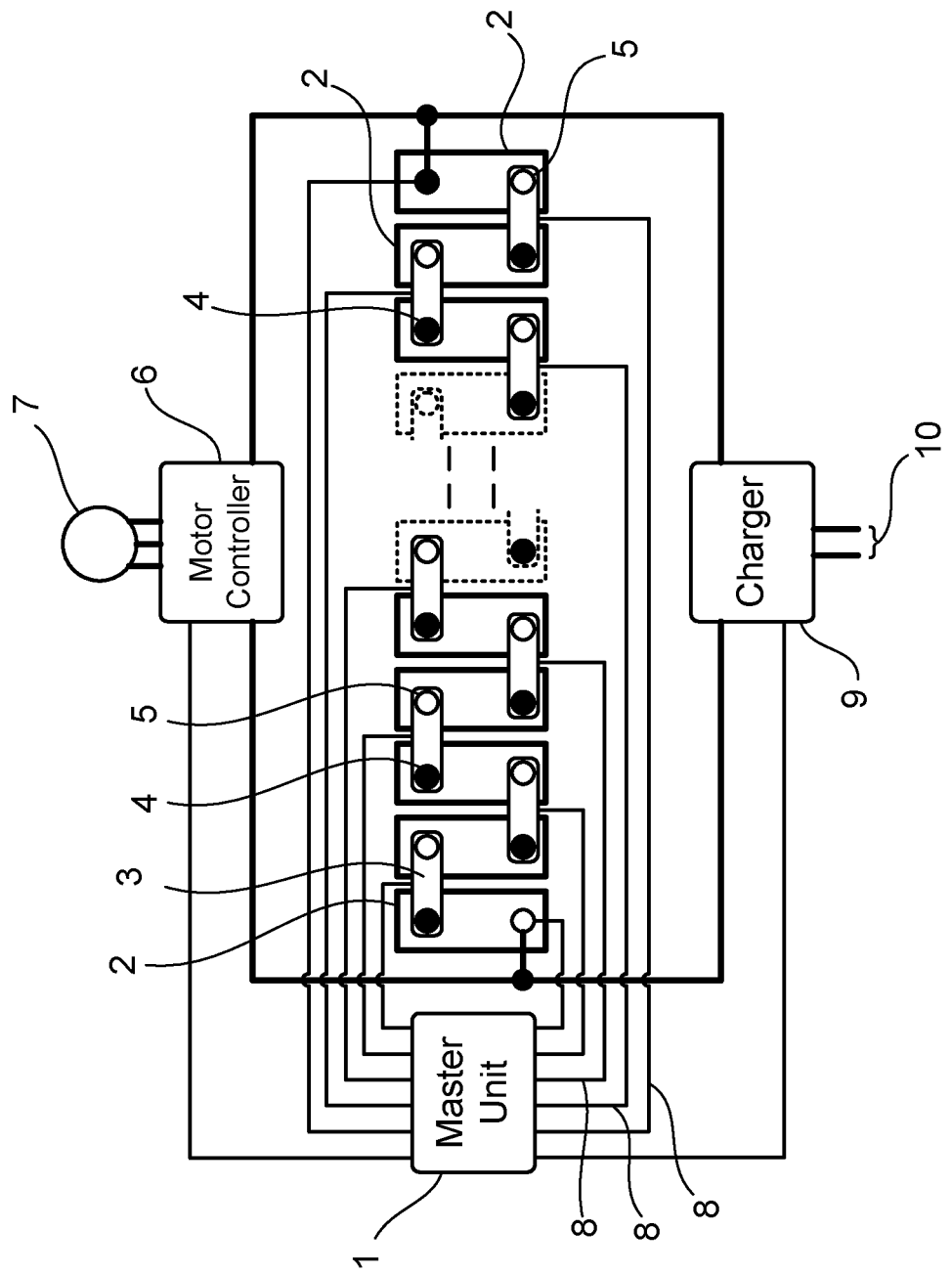
FIG. 1 shows a schematic layout of a typical BMS.

In a further arrangement, individual cell voltage monitoring may be used to monitor the cell voltages to identify if any single cell voltage is deviating significantly from a desired voltage and take steps accordingly. To achieve this an arrangement similar to that shown in FIG. 1 is used where the voltage of each cell is determined. However, unlike conventional BMS where the connections may need to be used for active balancing and so carry significant currents, the connections in this arrangement are used only for voltage sensing and so their current capacity can be much lower.

This arrangement is operated using a modified CC/CV (Constant Current/Constant Voltage) charge profile. The CC phase is similar to that described above, in which the battery is charged at a substantially constant current level for much of the typical charging cycle. As the battery comes close to full capacity, the battery voltage will approach the value mentioned above and the will then switch to the constant voltage mode.

The constant voltage mode is however modified to base the control on individual cell voltages so that no single cell voltage exceeds a predetermined threshold level. The voltage of all the cells is monitored and the battery charge current is controlled so that the cell with the highest voltage is maintained at or below the threshold level. In other words rather than controlling the voltage of the entire battery as in the CV mode described above, the control is at the cell voltage level and provides a constant cell voltage (CCV) charging mode. The control is based on limiting the cell with the maximum voltage out of all the cells. The cell with the maximum voltage may change to a different cell during the course of charging as the slight differences in the cells comes into effect.

Figure 11:
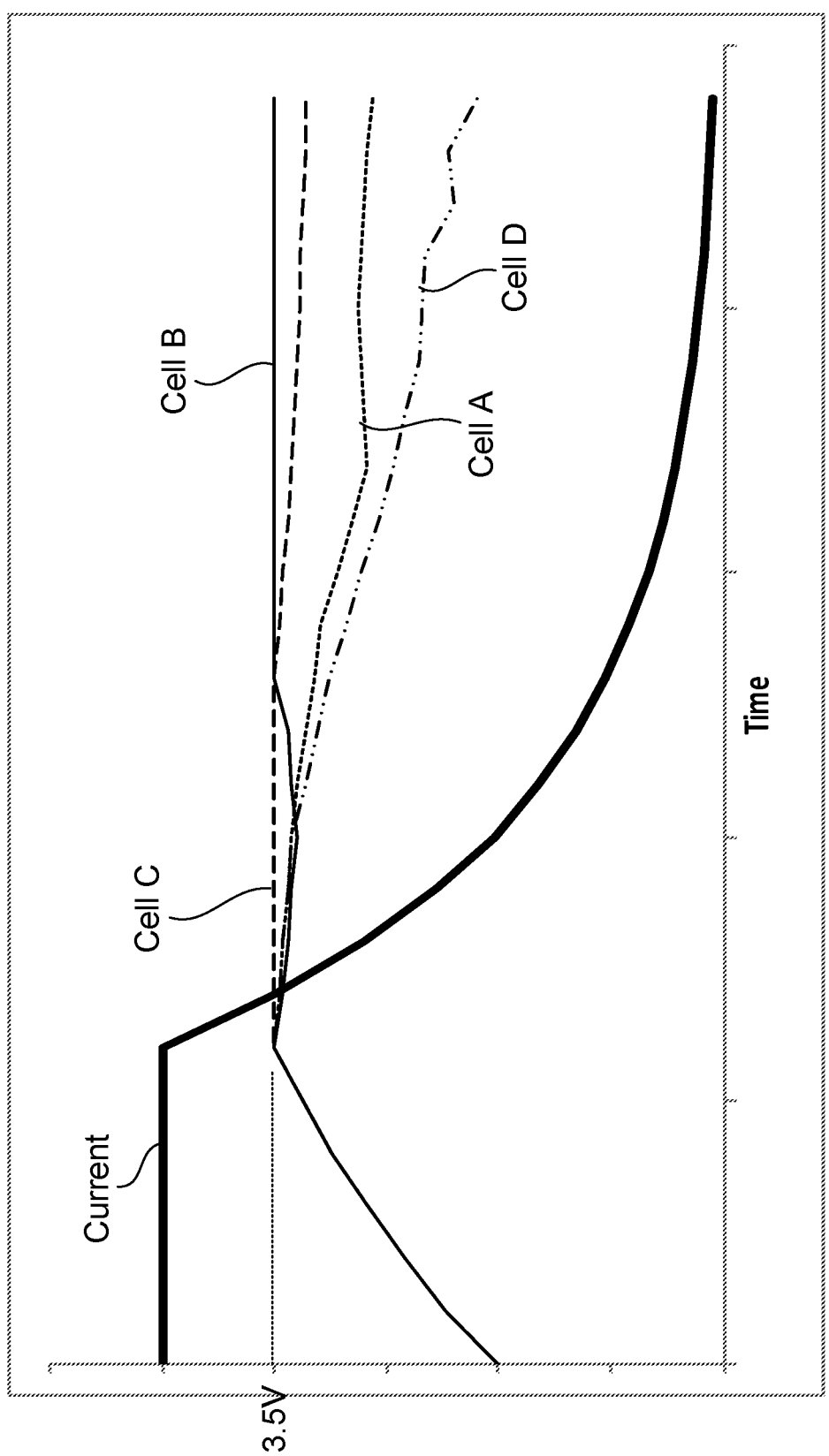
FIG. 11 shows the operation of a BMS using cell voltage control.

FIG. 11, shows schematically operation using CCV mode in a simple battery of 4 cells (A-D). As shown, the current is initially constant in the CC phase (the individual cell voltages are not shown in this part of the graph as they are not monitored in this phase), until operation begins in the CCV mode, shown on the right hand portion of the graph. The threshold level is, in this example, set at 3.5V. As the CCV mode starts, cell C initially has the highest cell voltage, as shown in FIG. 11. The charging current is controlled to keep the voltage across cell C at 3.5V. All the other cell voltages will be at or below 3.5V. Over time, cell B's voltage rises and begins to exceed the voltage on cell C. The controller identifies that cell B has become the cell with the highest voltage and now controls the current to limit the voltage of cell B to be 3.5V. This may result in the voltage of cell C dropping below 3.5V, as shown in FIG. 11. From this point the voltage on cell B will be the controlling parameter unless the voltage on one of the other cells rises above that of cell B.

In this way, no cell can exceed the threshold level (3.5V) protecting them from overvoltage, even if this would cause all charging to stop. Eventually, as all the cells approach full charge, the current will drop until it reaches a second preselected level. This may be selected to be 5% of the original charge current during the CC phase. At this point charging is terminated. With the above arrangement, a high level of charge can be provided to the cells without the risk of any single cell being over charged or going over its permitted maximum voltage.

Although the CCV charging mode above monitors the voltage of each cell the problems of cell imbalance in conventional BMS systems is avoided. With a conventional BMS, the monitoring of the cell voltage can be problematic due to the differential load imposed by the monitoring, as mentioned above. However, conventional BMS tend to deal with this issue by actively rebalancing the battery rather trying to avoid the battery going out of balance. However, by keeping the monitoring current low, such as by using voltage followers, for example based on operational amplifiers, lower monitoring currents can be achieved. In this way, the cells do not go out of balance to a significant extent and so active rebalancing can be avoided.

For example, in a 100 cell pack, a typical cell voltage monitoring load per cell may be of the order of 35 micro amps. However, as described above, the voltage monitoring typically measures the voltage between the cell and ground. Measuring each cell voltage independently would considerably increase the complexity of the monitoring equipment. So, the load current due to the monitoring equipment on the top cell (furthest from ground) may be 35 micro amps. However, for the bottom cell (closest to ground) the monitoring load current for all the cells must pass through it. This means that the differential load between the top cell and the bottom cell is just under 3.5 milliamps (99 cells×35 $\mu$A). This can, over a year, lead to a charge imbalance of around 30 Ah ($8760 \times 3.5 \times 10^{-3}$). This assumes that the monitoring is permanently operating on the cells over the year. Such an imbalance (30%) on a typical 100 Ah cell will very quickly (well within 1 year) become appreciable and may affect the operation of the battery. This is why conventional BMS use active balancing to mitigate this imbalance.

However, with the arrangement above, cell voltage only needs to be monitored at the end of the charge process (after the CC phase) and can be turned off at other times, i.e. when discharging; when the battery is not in use and during most (the CC phase) of the charge cycle. In other words, the monitoring may only need to be used for a small proportion (the CCV phase) of the overall charge cycle, as most of the charge cycle is occupied by the constant current phase.

Therefore this arrangement provides the ability to charge to a high level of maximum charge without the risk of overcharging any single cell. Although this does require cell level voltages during the CCV phase, because the cell voltage measurements are not taken constantly, any unbalancing effect is considerably smaller than with convention BMS and so the need for active balancing of the battery can be avoided. The load caused by cell voltage monitoring can also be minimised by for example using op-amp type voltage followers to reduce the monitoring load imbalance. The absence of active balancing in this arrangement also means that the monitoring wires are only used for voltage monitoring purposes with very low currents and not for carrying the much higher currents used for active balancing and so they can be much smaller than with traditional BMS.

It will be appreciated that the above arrangements may be used in conjunction with each other or separately. In this way, statically balanced batteries may use early termination to avoid overcharging of individual cells as well as using a CCV phase to prevent any single cell going over voltage.

In the above examples, specific values have been used according to the types of cells used in the examples. However, it will be appreciated that different cells, particularly those with different chemistry, may have different parameters, such as the cell voltage and also the charging currents.

The invention claimed is:

1. A rechargeable battery management system comprising:
   a battery comprising a plurality of series connected cells, which are statically balanced by equalizing the state of charge of each of the cells when they are rested and prior to installation in the battery management system, wherein the battery is arranged such that a substantially identical current flows through each of the cells in use, and no dynamic balancing of the cells takes place once the battery is installed in the battery management system; and
   a battery charging controller for controlling the charging of the battery by terminating charging prior to the cells reaching their maximum state of charge.

2. A rechargeable battery management system according to claim 1, wherein said battery charging controller is arranged to control charging of the battery using an initial battery charging current controlled phase followed by a battery voltage controlled phase, and terminating charging during the battery charging voltage controlled phase when said charging current falls below a first threshold value, wherein said first threshold is determined based on the cells of the battery, such that when the charging current is above the first threshold value during the charging voltage controlled phase, the individual cell voltages do not deviate substantially from each other.

3. A rechargeable battery management system according to claim 1, wherein after terminating charging, said battery charging controller is adapted to carry out one or more additional charging periods in which charging is restarted after a rest period and charging is again terminated.

4. A rechargeable battery management system according to claim 3, wherein said rest period has a duration of between 2 and 15 minutes.

5. A rechargeable battery management system according to claim 1, further comprising:
   a cell voltage monitor for determining the respective cell voltage of each of said plurality of cells, wherein:
   said battery charging controller is arranged to control charging of the battery using an initial battery charging current control phase followed by a cell voltage control phase, and to determine a maximum cell voltage value, being the cell voltage on one of said plurality of cells having the highest cell voltage, and to control the charging of the battery, during said cell voltage control phase, to maintain the maximum cell voltage value, being the cell voltage on one of said plurality of cells having the highest cell voltage, at a target value.

6. A rechargeable battery management system according to claim 1, wherein said plurality of cells are pre-qualified prior to inclusion in the battery, to exclude cells which have soft shorts by monitoring the cell voltage over time and disqualifying cells which show a drop in cell voltage.

7. A rechargeable battery management system according to claim 1, further comprising:
   a plurality of temperature sensors, each arranged for sensing the temperature of at least one of said cells; and
   a battery monitor, wherein
   said temperature sensors are configured to provide temperature information signals to said battery monitor;
   said battery monitor is configured to determine whether each of the received temperature information signals conforms to an acceptable pattern; and
   said battery monitor is configured to raise an exception, if one of more of the received temperature information signals does not conform to said acceptable pattern.

8. A rechargeable battery management system according to claim 7, wherein said monitored temperature does not conform to an acceptable pattern if the monitored temperature is outside a first predetermined range.

9. A rechargeable battery management system according to claim 7, wherein said monitored temperature does not conform to an acceptable pattern if the rate of change of the monitored temperature is outside a second predetermined range.

10. A rechargeable battery management system according to claim 7, wherein said monitored temperature does not conform to an acceptable pattern if the variance of the monitored temperature from an average temperature of two or more of the temperature sensors is greater than a first predetermined amount.

11. A rechargeable battery management system according to claim 7, wherein said monitored temperature does not conform to an acceptable pattern if the variance of the rate of change of said monitored temperature from an average rate of change of temperature of two or more of the temperature sensors is greater than a second predetermined amount.

12. A method of operating a rechargeable battery comprising:
    statically balancing a plurality of cells by equalizing the state of charge of each of the cells when they are rested and prior to installation in the battery and carrying out no dynamic balancing of the cells once the battery is installed in the battery management system;
    connecting the plurality of statically balanced cells in series to form said battery;
    arranging connections between the cells such that a substantially identical current flows through each cell in use; and
    controlling the charging of the battery by terminating charging prior to the cells reaching their maximum state of charge.

13. A method of operating a rechargeable battery according to claim 12, wherein said controlling the charging of the battery by terminating charging prior to the cells reaching their maximum state of charge comprises charging the battery using an initial battery charging current controlled phase followed by a battery charging voltage controlled phase, and terminating charging during the battery charging voltage controlled phase when said charging current falls below a first threshold value, wherein said first threshold value is predetermined based on the cells of the battery to prevent the individual cell voltages of deviating from each other.

14. A method of operating a rechargeable battery according to any one of claim 12, further comprising, after controlling the charging of the battery to terminate charging, carrying out one or more additional charging periods in which charging is restarted after a rest period and charging is again terminated.

15. A method of operating a rechargeable battery according to claim 12, further comprising:
    charging the battery during a current control phase by controlling the battery charging current; and
    charging of the battery during a cell voltage control phase, after said current control phase, including determining a maximum cell voltage value, being the cell voltage on one of said plurality of cells having the highest cell voltage and controlling the battery charging current to the battery, to maintain the maximum cell voltage value at a target value.

16. A method of operating a rechargeable battery according to claim 12, further comprising pre-qualifying said cells prior to inclusion in the battery, wherein said pre-qualifying includes selecting said cells from a plurality of candidate cells and excluding candidate cells having soft shorts by discharging the cell, monitoring the cell voltage over time and disqualifying cells which show a drop in cell voltage.

17. A method of operating a rechargeable battery according to claim 12, further comprising providing a plurality of temperature sensors, each arranged for sensing the temperature of at least one of said cells, the method further comprising operating the battery by:
monitoring the temperature of each temperature sensor;
determining if the monitored temperature of each temperature sensor conforms to an acceptable pattern; and
raising an exception, if it is determined that the monitored temperature of one or more of the temperature sensors is does not conform to said acceptable pattern.

18. A method of operating a rechargeable battery according to claim 12, wherein said cells are statically balanced by bottom balancing the state of charge of the cells individually.

19. A rechargeable battery management system according to claim 1, wherein said battery charging controller is arranged to control charging of the battery using an initial battery charging current control phase followed by a cell voltage control phase, and to determine a maximum cell voltage value, being the cell voltage on one of said plurality of cells having the highest cell voltage, and
said battery charging controller is further arranged to control the charging of the battery, during said cell voltage control phase, to maintain the maximum cell voltage value at a target value.

20. A method of operating a rechargeable battery according to claim 13, further comprising, after controlling the charging of the battery to terminate charging, carrying out one or more additional charging periods in which charging is restarted after a rest period and charging is again terminated.

21. A method of operating a rechargeable battery according to claim 12, further comprising:
charging the battery during a current control phase by controllling the battery charging current; and
charging of the battery during a cell voltage control phase, after said current control phase, including determining a maximum cell voltage value, being the cell voltage on one of said plurality of cells having the highest cell voltage and controlling the battery charging current to the battery, to maintain the maximum cell voltage value at a target value.

22. A rechargeable battery management system according to claim 2, wherein after terminating charging, said battery charging controller is adapted to carry out one or more additional charging periods in which charging is restarted after a rest period and charging is again terminated.

* * * * *